United States Patent [19]

Baran

[11] Patent Number: 5,544,164
[45] Date of Patent: Aug. 6, 1996

[54] METHOD AND CELL BASED WIDE AREA NETWORK ALTERNATIVE ACCESS TELEPHONE AND DATA SYSTEM

[75] Inventor: Paul Baran, Atherton, Calif.

[73] Assignee: COM 21, Inc., Mountain View, Calif.

[21] Appl. No.: 336,325

[22] Filed: Nov. 8, 1994

Related U.S. Application Data

[63] Continuation of Ser. No. 953,744, Sep. 29, 1992, abandoned.

[51] Int. Cl.$^6$ .................................................. H04L 12/56
[52] U.S. Cl. .................. 370/60.1; 370/94.2; 340/825.52
[58] Field of Search ........................... 370/60, 60.1, 85.8, 370/94.1, 94.2, 94.3, 95.2, 110.1; 340/825.08, 825.52, 825.53; 379/201, 211, 216, 219, 220, 57, 269; 455/5.1; 358/85, 86

[56] References Cited

U.S. PATENT DOCUMENTS

| | | | |
|---|---|---|---|
| 2,957,047 | 10/1960 | Wennemer | 379/211 |
| 4,191,860 | 3/1980 | Weber | 179/18 |
| 4,245,245 | 1/1981 | Matsumoro et al. | 358/122 |
| 4,356,484 | 10/1982 | Eckhardt | 340/825.03 |
| 4,404,514 | 9/1983 | Reichert, Jr. | 455/5.1 |
| 4,430,731 | 2/1984 | Gimple et al. | 370/30 |
| 4,521,881 | 6/1985 | Stapleford et al. | 370/72 |
| 4,530,008 | 7/1985 | McVoy | 358/86 |
| 4,533,948 | 8/1985 | McNamara et al. | 358/122 |
| 4,534,024 | 8/1985 | Maxemchuck et al. | 370/85 |
| 4,577,312 | 3/1986 | Nash | 370/112 |
| 4,633,462 | 12/1986 | Stifle et al. | 358/86 |
| 4,689,619 | 8/1987 | O'Brien, Jr. | 358/86 |
| 4,698,841 | 10/1987 | Haselton et al. | 370/60 |
| 4,717,970 | 1/1988 | Long | 358/86 |
| 4,751,510 | 6/1988 | de Saint Michel et al. | 370/84 |
| 4,763,317 | 8/1988 | Lehman et al. | 370/60 |
| 4,763,322 | 8/1988 | Eizenhofer | 370/95 |
| 4,763,323 | 8/1988 | Nelson et al. | 370/96 |
| 4,764,920 | 8/1988 | Furuya | 370/94 |
| 4,768,188 | 8/1988 | Barnhart et al. | 370/80 |
| 4,771,425 | 9/1988 | Baran et al. | 370/85 |
| 4,797,879 | 1/1989 | Habbab et al. | 370/3 |
| 4,819,228 | 4/1989 | Baran et al. | 370/85 |
| 4,829,297 | 5/1989 | Ilg et al. | 340/825.5 |
| 4,860,379 | 8/1989 | Schoeneberger et al. | 455/5.1 |
| 4,901,340 | 2/1990 | Parker et al. | 379/60 |
| 4,903,261 | 2/1990 | Baran et al. | 370/110.1 |
| 4,920,533 | 4/1990 | Dufresne et al. | 370/85.2 |
| 4,933,935 | 6/1990 | Adams | 370/85.7 |
| 4,949,395 | 8/1990 | Rydbeck | 455/33.1 |
| 4,951,278 | 8/1990 | Biber et al. | 370/60 |
| 4,956,839 | 9/1990 | Torii et al. | 370/60 |
| 4,959,862 | 9/1990 | Davidov et al. | 380/10 |
| 4,961,188 | 10/1990 | Lau | 370/94.2 |
| 4,970,717 | 11/1990 | Haas | 370/60 |
| 4,972,505 | 11/1990 | Isberg | 455/3.1 |

(List continued on next page.)

OTHER PUBLICATIONS

Jerrold Communications, *PCN Interface Using CATV Feeder, In–Home PCN Integration, PCN Interface At The Home, In–Home Interface, In–Home PCN Interface, Integrated Home Block Diagram.*

Leland L. Johnson and David P. Reed, *Residential Broadband Services by Telephone Companies?*, Technology, Economics, and Public Policy, RAND, R–3906–MF/RL, Jun. 1990, pp. v–ix.

James Chiddix and Ronald Wolfe, Communications Engineering and Design, *Fiber optic implementation, A case study,* Sep. 1989, pp. 8, _, 14, 16, 19, 21–22.

Primary Examiner—Hassan Kizou
Attorney, Agent, or Firm—Allston L. Jones

[57] ABSTRACT

The present invention is a Wide Area Network (WAN) Asynchronous Transfer Mode (ATM) compliant cell based communications system that is capable of delivering high data rate cells from a plurality of terminal devices to support a multiplicity of simultaneous terminal device applications for homes and businesses. This system provides the capability of providing voice and data communications on cable TV systems and to tie multiple cable TV systems and telcos together for transmission of voice and data communication between any combination of them.

5 Claims, 28 Drawing Sheets

U.S. PATENT DOCUMENTS

| | | | |
|---|---|---|---|
| 4,980,886 | 12/1990 | Bernstein | 370/80 |
| 4,980,907 | 12/1990 | Raith et al. | 379/63 |
| 4,982,440 | 1/1991 | Dufresne et al. | 445/4.1 |
| 4,991,172 | 2/1991 | Cidon et al. | 370/94.1 |
| 4,991,206 | 2/1991 | Blais | 380/7 |
| 4,998,247 | 3/1991 | Irvine-Halliday et al. | 370/94.1 |
| 5,001,707 | 3/1991 | Kositpaiboon et al. | 370/94.1 |
| 5,007,043 | 4/1991 | Van Den Dool et al. | 370/60 |
| 5,010,329 | 4/1991 | Nagakura | 370/95.2 |
| 5,012,469 | 4/1991 | Sardana | 370/95.3 |
| 5,016,245 | 5/1991 | Lobjinski et al. | 370/60 |
| 5,029,163 | 7/1991 | Chao et al. | 370/95.1 |
| 5,067,123 | 11/1991 | Hyodo et al. | 370/58.1 |
| 5,107,493 | 4/1992 | Eng et al. | 370/94.1 |
| 5,111,454 | 5/1992 | Hung et al. | 370/95.3 |
| 5,115,431 | 5/1992 | Williams et al. | 370/94.1 |
| 5,124,980 | 7/1992 | Maki | 370/77 |
| 5,130,793 | 7/1992 | Bordry et al. | 455/5.1 |
| 5,132,680 | 7/1992 | Tezuka et al. | 340/825.08 |
| 5,138,649 | 8/1992 | Krisbergh et al. | 379/56 |
| 5,150,361 | 9/1992 | Wieczorek et al. | 370/95.1 |
| 5,161,154 | 11/1992 | Diaz et al. | 370/95.1 |
| 5,164,937 | 11/1992 | Tanabe et al. | 370/56 |
| 5,241,534 | 8/1993 | Omuro et al. | 370/16 |

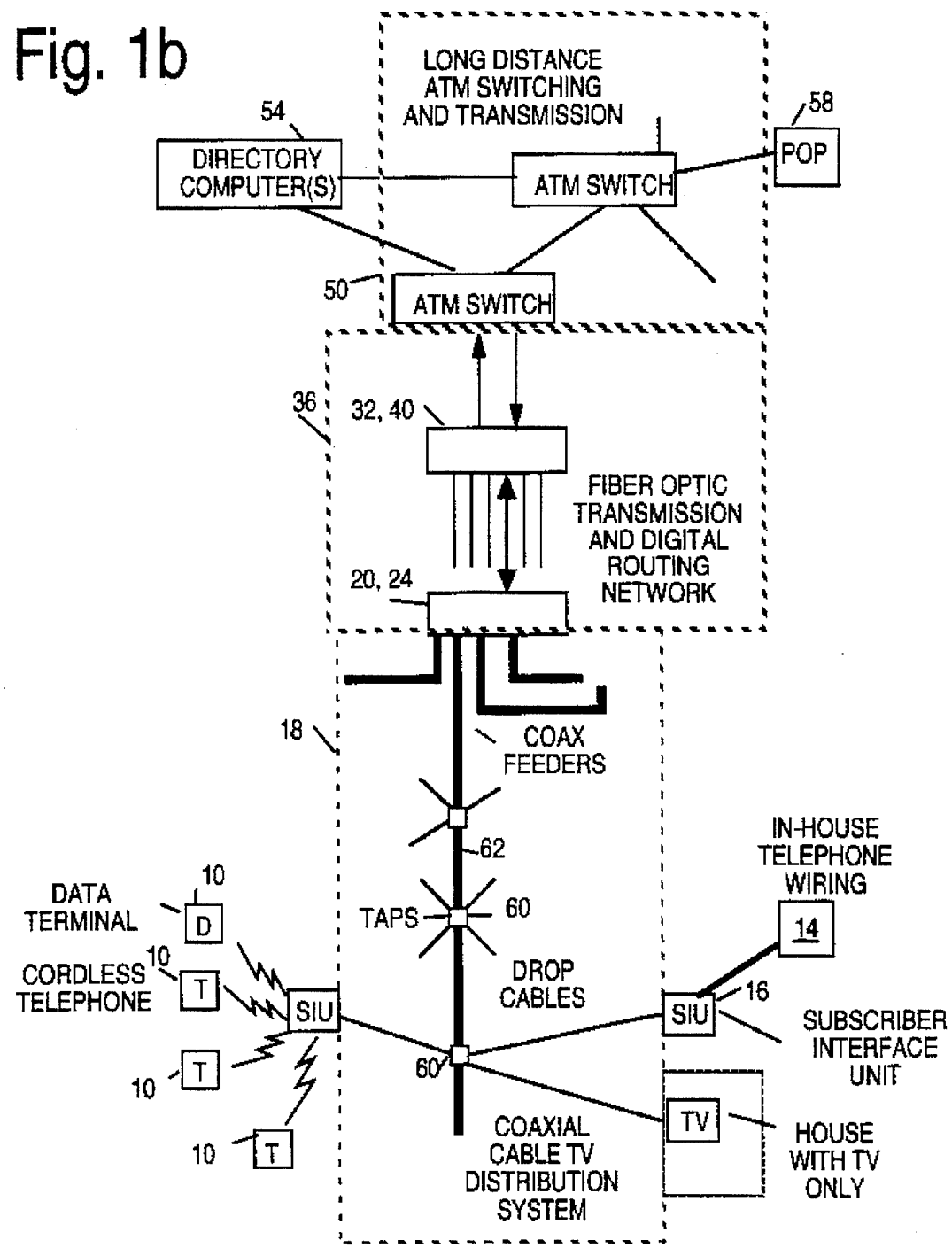

[DIRECT CONVERSION TRANSCEIVER]

[OSC & CONTROL SECTION]

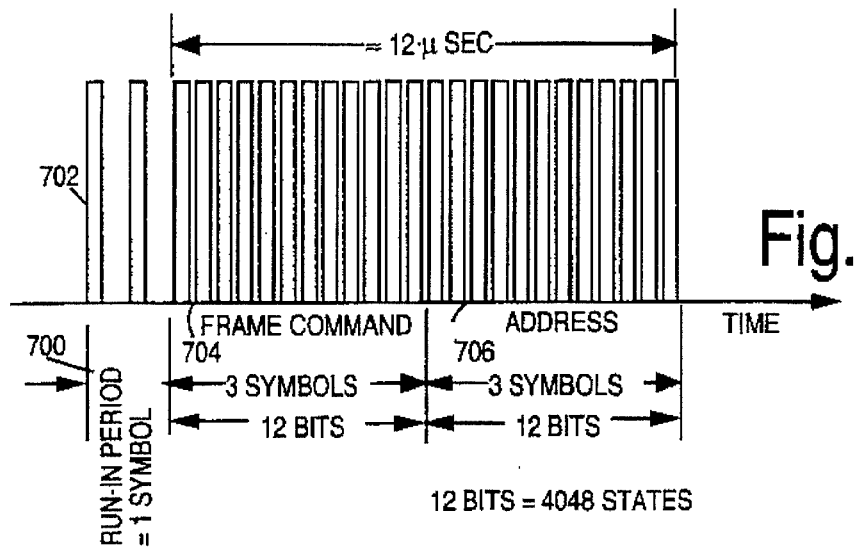
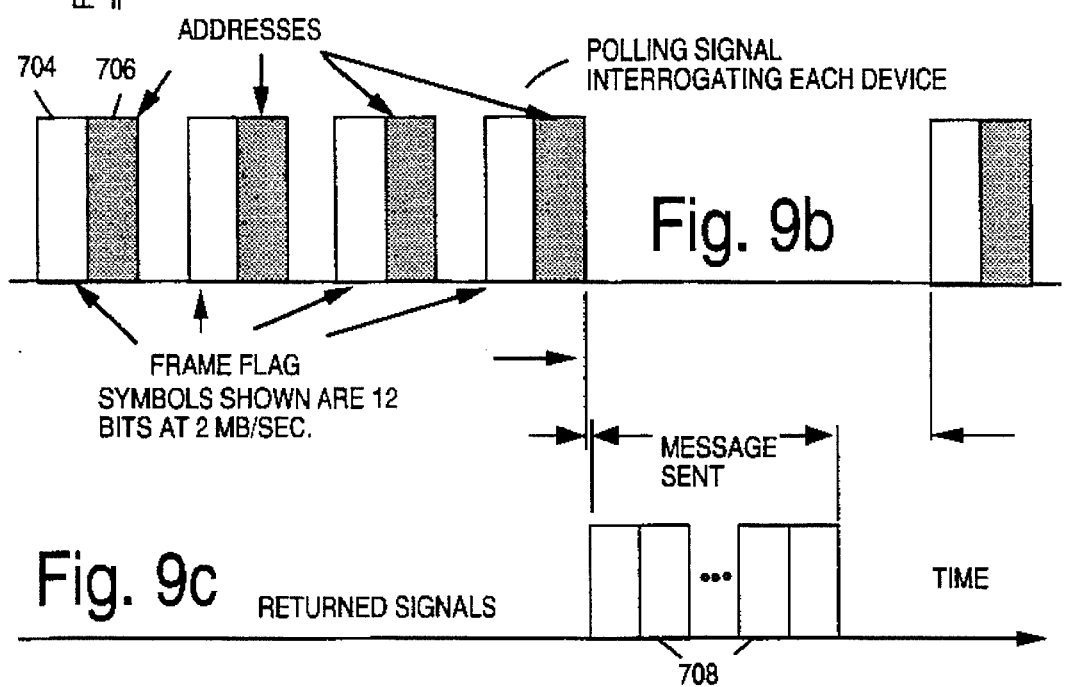

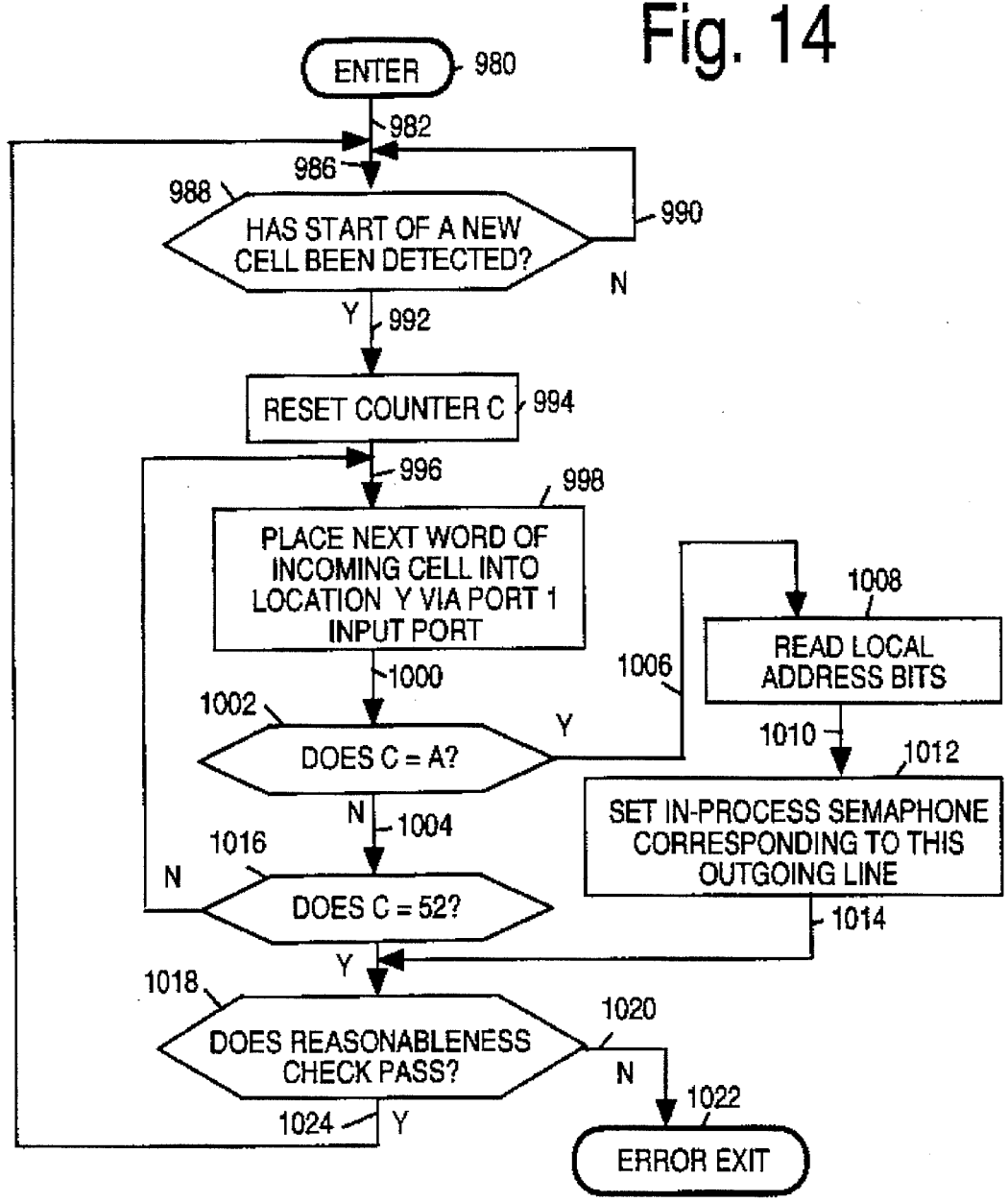

[OVERLAPPING SIDEBANDS TO SAVE SPECTRUM SPACE]

[NOTE 1. HETERODYNING THE 5-30 MHZ BAND GENERATES UNWANTED SIDEBANDS. THESE ARE INTENTIONALLY POSITIONED TO OVERLAP ONE ANOTHER TO SAVE UPSTREAM BANDWIDTH.]

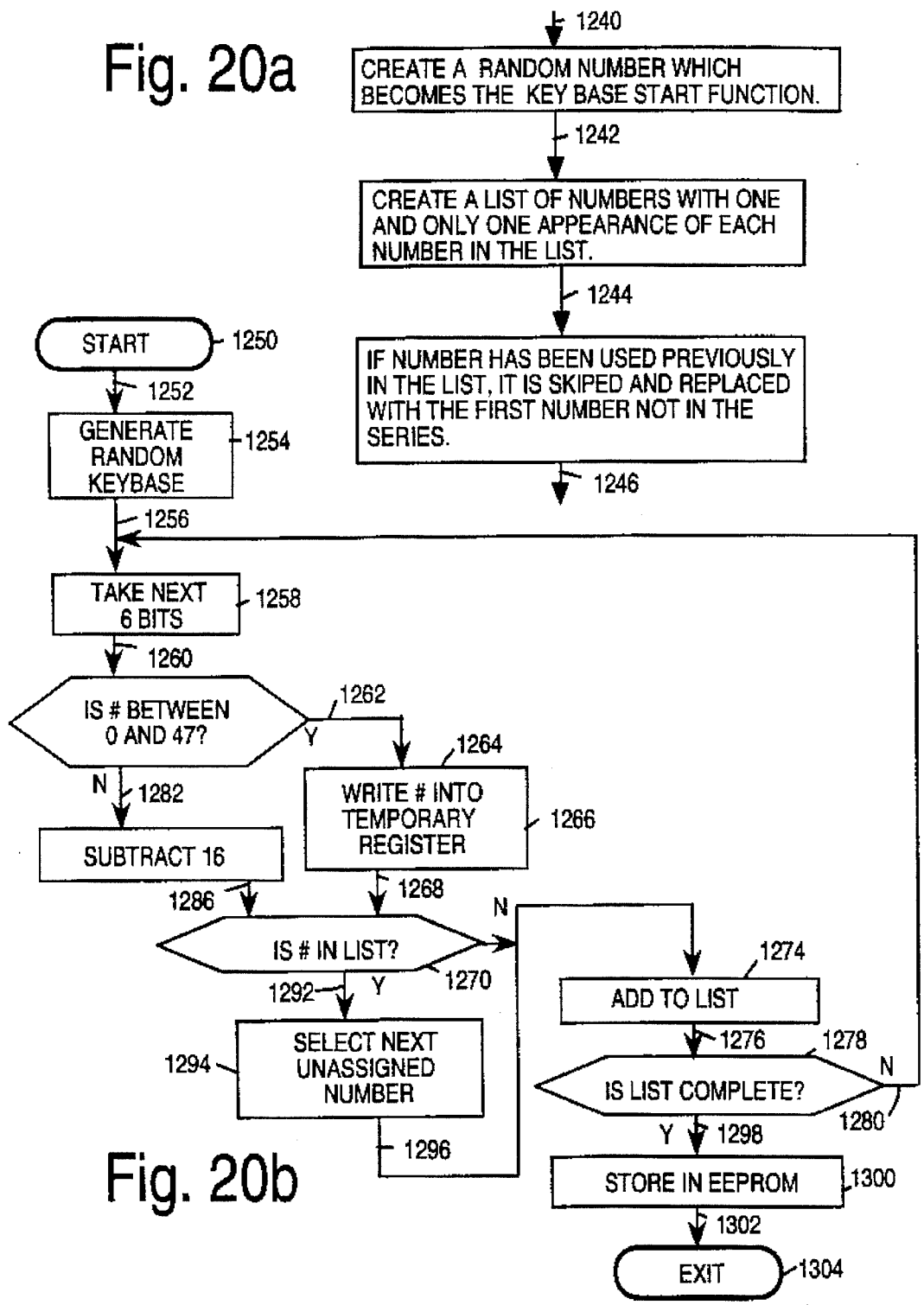

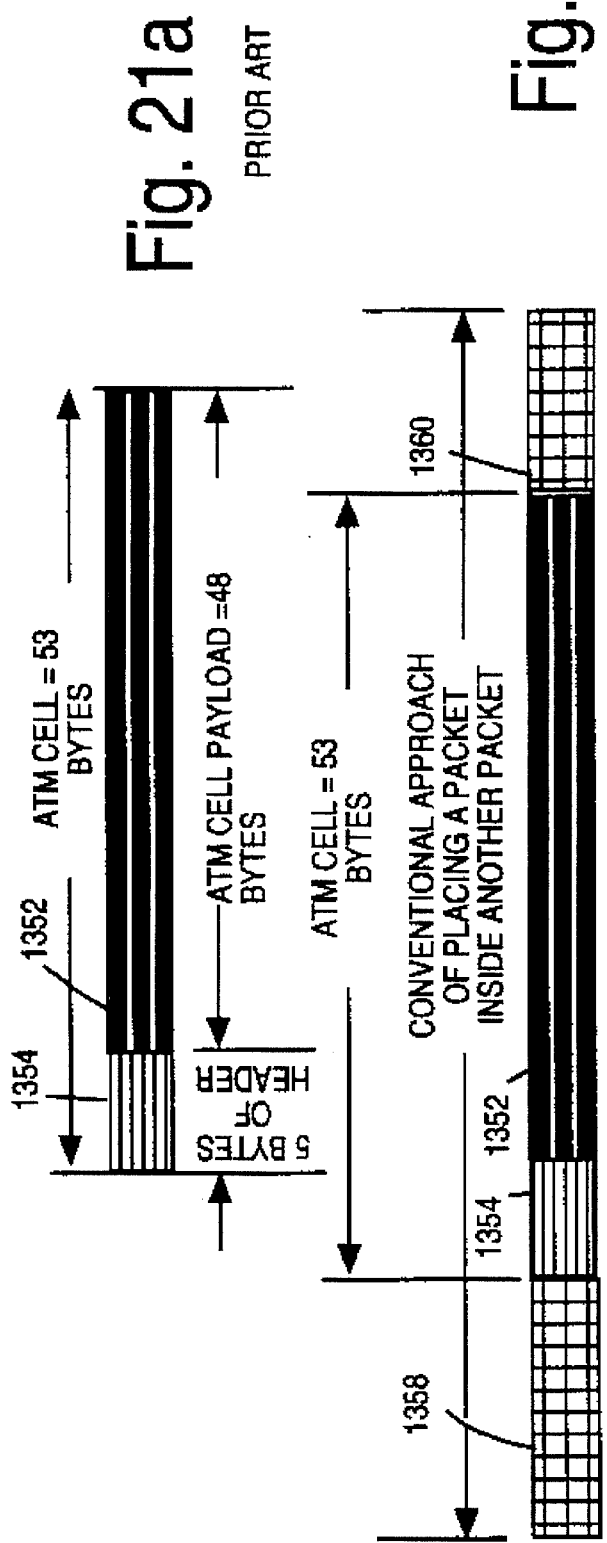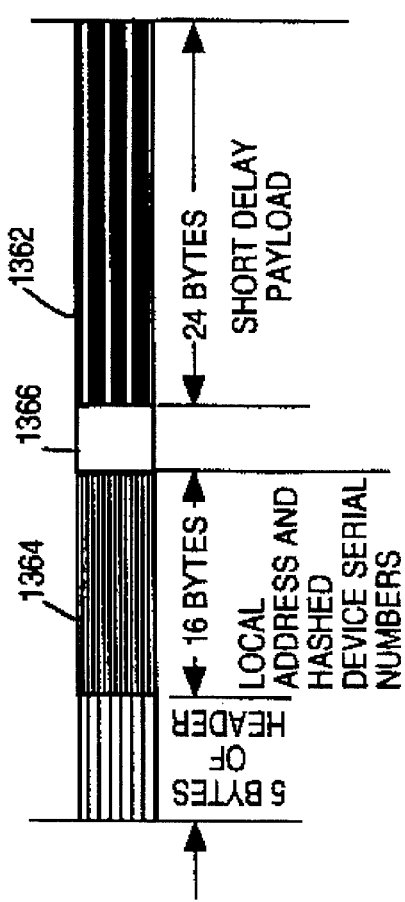

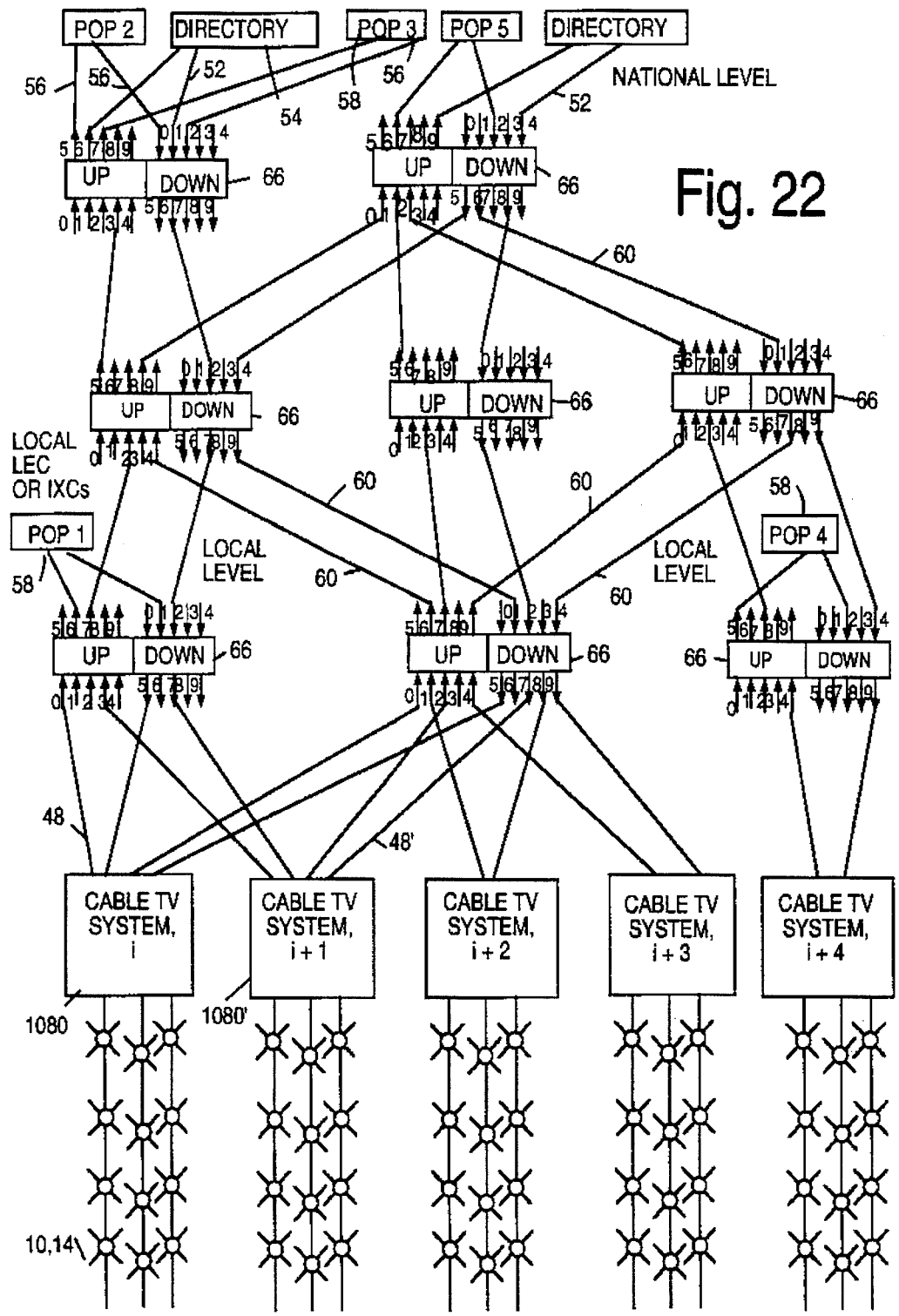

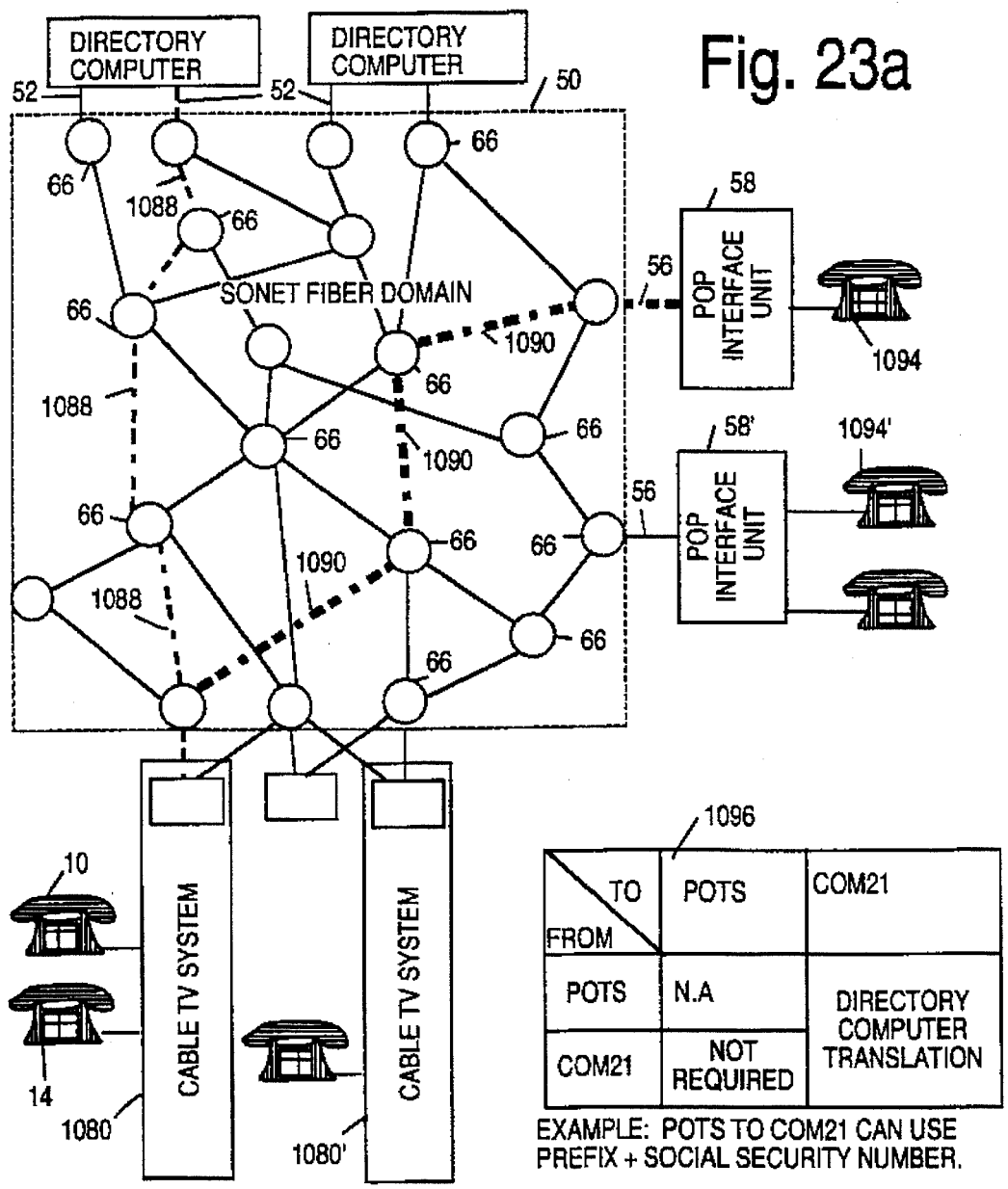

*ALSO CHECKS TO SEE THAT THERE ARE NO ON-GOING CONVERSATIONS..
OTHER MESSAGES INCLUDE: NUMBER BEING FORWARDED; TEMPORARILY OUT OF SERVICE; NO SERVICE BECAUSE OF AN UNPAID BILL, ETC.

1. ADDRESS SPACE FOR 48 BITS = $2^{}48$ = $2.81 \times 10^{}14$.

2. NUMBER OF VALID ADDRESSES = $2 \times 10^{**}6$.

3. PROBABILITY OF NOT CATCHING AN ERROR = $(2 \times 10^{}6) / (2.81 \times 10^{}14)$ = $7.11 \times 10^{**}9$

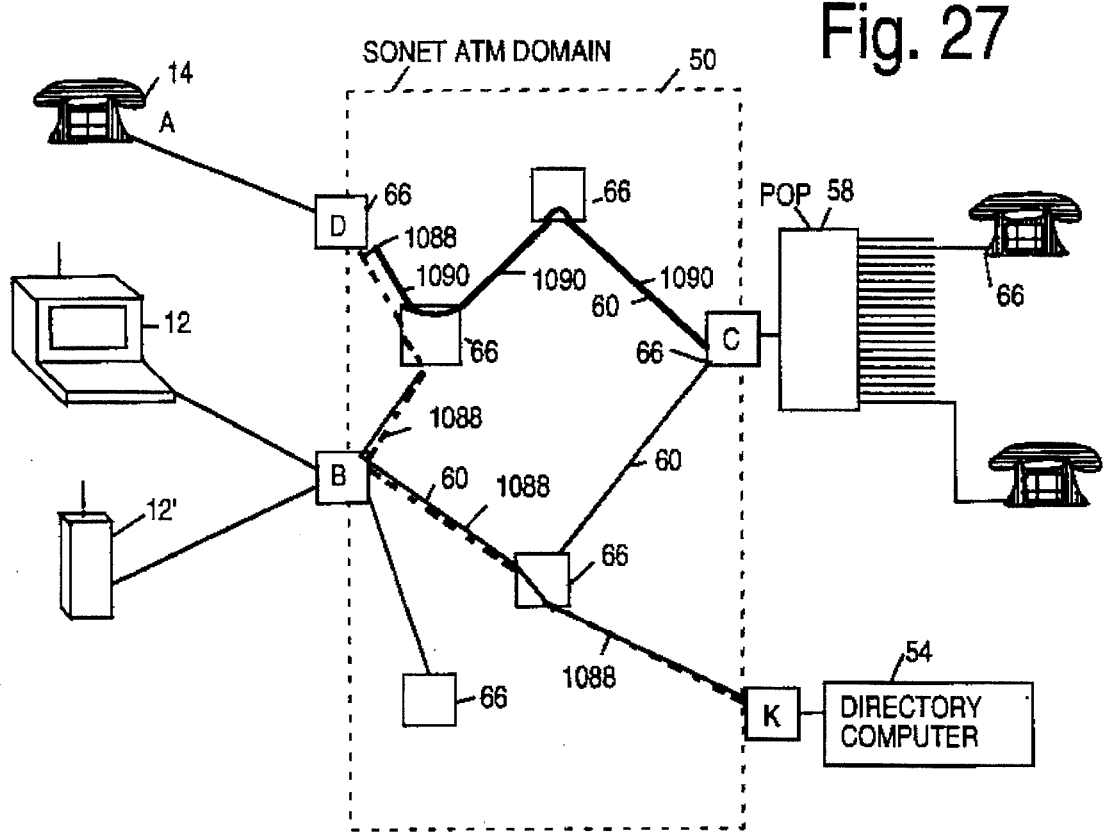

Fig. 27

A UBIQUITOUS, FAST PACKET NETWORK, WITH VIRTUAL CONNECTIONS THAT CAN BE SET UP BETWEEN ANY PAIRS OF USERS DESIRING COMMUNICATIONS.

A DATAGRAM CONTROL PACKET FROM A TO D TO K SETS UP THE CONNECTION; THEREAFTER A VIRTUAL CIRCUIT EXISTS BETWEEN A TO D TO C.

THIS CREATES THE ILLUSION OF A COPPER WIRE CIRCUIT FROM A TO C.

AFTER THE COMMUNICATIONS SESSION IS COMPLETED A DATAGRAM CONTROL PACKET FROM A OR FROM C TO K KNOCKS DOWN THE VIRTUAL CONNECTION.

METHOD AND CELL BASED WIDE AREA NETWORK ALTERNATIVE ACCESS TELEPHONE AND DATA SYSTEM

CROSS REFERENCE

This is a continuation of application Ser. No. 07/953,744, filed on Sep. 29, 1992, now abandoned. The present application is related to two patent applications by the same inventor, a first one entitled "DIGITAL TELEPHONE, CABLE TV SYSTEM AND LOCAL EXCHANGE BYPASS NETWORK" filed on Sep. 17, 1991, and given Ser. No. 07/761,281, now U.S. Pat. No. 5,421,030, and a second one entitled "METHOD AND APPARATUS FOR SHARING OF COMMON IN-HOUSE WIRING TO PERMIT MULTIPLE TELEPHONE CARRIERS TO SERVE THE SAME CUSTOMER" filed Sep. 22, 1992, and given Ser. No. 07/949,424, now U.S. Pat. No. 5,341,415, with those applications being assigned to the same assignee as the present invention.

FIELD OF THE INVENTION

A communications network for data and voice communications which links telephone and cable TV systems for providing an expanded and competitive communications system.

BACKGROUND OF THE INVENTION

The use of a cable TV system as an alternative local loop instead of telco (telephone company) copper wires has been proposed many times over the years. A few systems have been built which use separate frequency division multiplexed carriers for each telephone, but the economics has not been competitive, nor the performance fully acceptable. Some systems have been proposed which use fiber optic lines carrying analog cable TV signals together with PCN (Personal Communications Network) digital voice telephone signals to distribution pedestals serving a cluster of houses with both TV and telephones. Today, such alternative technologies remain higher cost alternatives than the present use of separate telephone plants, and separate cable TV systems (Ref: Johnson, Leland L. and David P. Reed, *RESIDENTIAL BROADBAND SERVICES BY TELEPHONE COMPANIES?*, The RAND Corp., June 1990).

Fiber optic cable is increasingly being used in new and rebuilt cable TV systems to replace the large diameter coaxial trunk cables carrying programs from cable TV head-ends to the feeder cable network. TV signals are transmitted using AM (and sometimes FM) modulation on fiber optic cables. These signals are converted to electrical signals at the feeder cable junction. This produces higher quality TV performance at a price comparable to an all coaxial cable TV system (Ref: Chiddex, James, "FIBER OPTIC IMPLEMENTATION: A CASE STUDY", Communications Engineering and Design September 1989, p. 8).

PCN which uses small radio telephones have been developed in Europe, the Far East and in the U.S. In the U.S. a plethora of applicants are filing for PCN licenses from the FCC in the hope that a monopoly value will accrue to the paper license similar to the cellular radio license experience, where the paper licenses were issued by lottery with the intention of being resold at a high price to the eventual system builder.

The closest relevant prior art of the present invention found was in a recent proposal by the Jerrold division of General Instruments, Co. described in a public presentation at the Cable TV Laboratories, Denver, Colo. Cable TV Laboratories is sponsored by a consortium of cable TV operators). In the presentation, Jerrold proposes using TV cable to connect PCN type telephone instruments to the telephone central office. PCN is a low power cellular approach and offers a simpler and lower cost base station arrangement than conventional cellular radio. Initially PCN was used to refer to wireless telephone calls that could only initiate calls. But, this definition of PCN is evolving towards initiation and receiving inbound calls. The shorter range of PCN, generally up to 600 meters, allows lower power levels than required by longer range cellular radio. In turn, this lower power requirement allows the use of smaller hand held telephone instruments with a longer battery life between recharges than the larger, more powerful, cellular radio telephones.

In the Jerrold proposal, PCN signals within the vicinity of a house are received by an active coupling unit physically connected to the end of the TV drop cable. These signals are transmitted upstream ("Upstream" refers to the direction toward the cable TV head-end, and "downstream" refers to the direction toward the terminal devices) via the drop cable. The drop cable connects to the TV feeder cable. An active coupling unit, used within the house, contains an amplifier, an AGC control circuit, a microprocessor and a varilloser (an amplitude limiting device) to provide a signal levelling capability to prevent strong PCN signals from swamping out other signals on the cable. The arrangement described creates a transmission path for frequency division of PCN device signals over the cable TV system.

It would be desirable to have a system that overcomes the limitations of the known proposals and describes a combined cable TV plus telephone system technology which appears to offer greater capabilities and at a potentially lower cost than known alternatives. More specifically, it would be desirable to have a system that adds telephone and data capability to existing cable TV systems, with special applicability to cable TV systems using fiber-to-the-feeder configurations. It would further be desirable to have a total end-to-end solution, starting with cell relay packets generated within cordless telephone instruments and thence transmitted through the cable TV system to seamlessly interconnecting with SONET (synchronous optical network) fiber optic systems operating in the ATM (asynchronous time multiplexing) mode for connection to fast packet switches. The present invention provides such a system.

SUMMARY OF THE INVENTION

A Wide Area Network (WAN) Asynchronous Transfer Mode (ATM) compliant cell based communications system that is capable of delivering high data rate cells from a plurality of terminal devices to support a multiplicity of simultaneous terminal device applications for homes and businesses. This system provides the capability of providing voice and data communications on cable TV systems and to tie multiple cable TV systems and telcos together for transmission of voice and data communication between any combination of them.

BRIEF DESCRIPTION OF THE DRAWINGS

FIG. 1b is another block diagram of the system of the present invention which includes more detail with respect to the feeder and drop cables of a cable TV system and how it is integrated into the present invention.

FIG. 3b is a block diagram of the details of the oscillator and control section of the cordless telephone unit of FIG. 3a.

FIG. 6b is a simplified block diagram the section of the subscriber interface unit of the present invention for use ADSL twisted pair in place of the cable TV section of FIG. 6a.

FIG. 9a illustrates the initial string of any signal which has been designed to minimize the time used in each signal for house keeping.

FIG. 9b illustrates the polling mode where the signal only consists of the initial string.

FIG. 9c shows a polling response.

FIG. 14 is a flow chart that illustrates the operation of the circuit of FIG. 12.

FIG. 20a is a flow chart that illustrates the permutation algorithm in flow chart form for part A of the key in FIG. 19.

FIG. 20b is a flow chart illustrates a more detailed flow chart of more specific algorithms that can be used to create a random number for the keybase as in FIG. 20a.

FIG. 21a illustrates the standard ATM cell of the prior art.

FIG. 21b illustrates the standard ATM cell of the prior art in an ATM cell packet.

FIG. 21c illustrates the modified ATM cell of the present invention.

FIG. 22 is another block diagram to illustrate the small component count necessary to implement the ATM DACS switching system of the present invention.

FIG. 23a is a simplified overview block diagram of the interconnection of cable TV systems and telcos by means of the present invention.

FIG. 23b is a table that illustrates when translation of the number being called is necessary by the directory computer is necessary for calls between various systems.

FIG. 27 is block diagram illustration of the basic network concept of the present invention.

DESCRIPTION OF THE PREFERRED EMBODIMENT

Figure 1A:
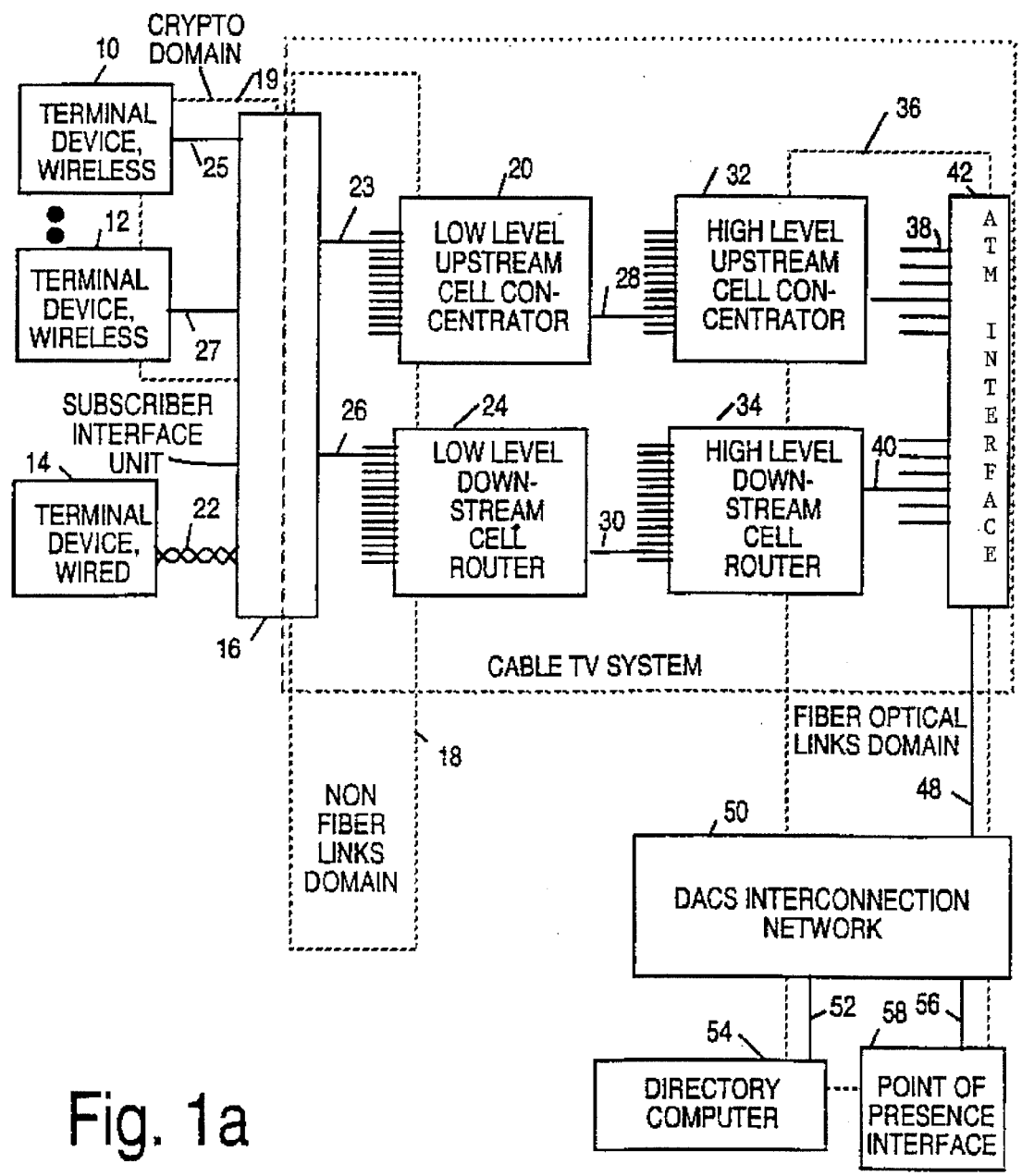
FIG. 1a is an overall system block diagram of the present invention.

The present invention is a Wide Area Network (WAN) Asynchronous Transfer Mode (ATM) compliant cell based communications system that is capable of delivering high data rate cells from a plurality of terminal devices to support a multiplicity of simultaneous terminal device applications for homes and businesses.

Terminal devices used with this system may be wired or wireless, such as voice and data transceivers. In the preferred embodiments the terminal devices are polled to allow each of many terminal devices to share a common dynamically assigned frequency channel. Signals within the system are transmitted using short fixed length cell packets. Each such cell packet contains unique information defining the source and far end destination for each cell packet with each string of cells being assembled and unpacked in such a manner as to create the illusion of a real time circuit.

By using an ATM complaint cell structure for the communicators, a graceful interconnection is feasible to the evolving international long-distance telephone switching and transmission structure.

The system of the present invention is unique in that it is able to use existing cable TV systems plus wireless devices to create a total alternative to the present local telephone exchange carriers (LECs).

Alternatively, the system is also adaptable and capable of being used by the LECs to use the existing twisted pair wires in a complementary manner from homes and businesses to carry high speed digital signals, in the megabit range, to join fiber optic paths and thus provide a competitive alternative to the plain ordinary telephone system (POTS).

The long term objective is to provide novel technology that allows the creation of competition in a domain historically considered to be a natural monopoly. This new technology could thus in turn lead to a significant increase in the overall telecommunications capability of the nation and the world.

The overall communications system of the present invention is composed of a number of subsystems. This invention includes subsystems that are capable of operating together as a system or as individual units that are capable of operation as individual subsystems for use in other applications. These subsystems include:

1. Terminal Devices which may be
   a. wired, and/or
   b. wireless.
2. Subscriber Interface Units (SIUs) which may have
   a. a TV cable, and/or
   b. telephone twisted pair wiring interface.
3. Upstream Cell Concentrators.
4. Downstream Cell Routers.
5. Non-fiber Optic Transmission Links.
6. Fiber Optic Transmission Links.
7. Asynchronous Transfer Mode (ATM) Interface.
8. Directory Computer.
9. DACS Network.
10. Point-of-Presence Interfaces.

1. TERMINAL DEVICES

The Terminal Devices are of two types, wired telephones and wireless voice and data transceivers.

Wireless Transceivers

This invention can use conventional wired telephones and modems as well as personal radio type transceivers wherein many separate such devices are operated in a shared band. Known methods of band sharing include spread spectrum CDMA, frequency division multiplexing and time division multiplexing.

The preferred novel, arrangement is the use of low powered radio transceivers to operate in a radio band in the U.S. so as to not require user licensing.

Dynamic Polling

A single unit dynamically polls each potential user. If any terminal device is ready to transmit, it would do so in the form of a short fixed length cell.

Unlicensed FCC Operation

It will be shown that if the data rate is sufficiently high, the resulting spectrum will be identical to a direct sequence spread spectrum signal. Inasmuch as these radiated signals are dynamically time division multiplexed they also produce channel coding as required by the FCC Rules, Section 15 Specification to make efficient use of the band as required for unlicensed operation.

Power Savings

The receiver is shut down except for a short instant every second or so to extend the battery life of the Wireless Terminal. When the wireless receiver receives a symbol indicating that a ring signal equivalent is being received the Wireless Terminal Device goes into active status.

Synchronous and Asynchronous Devices

The dynamic polling arrangement allows a mixture of telephone devices that operate in an almost synchronous manner as well as asynchronous data devices. In all cases data from the Wireless Terminal or by the SIU is formatted as ATM cells with the physical address inserted into the ATM five byte header.

In the case of wired terminal devices, such as the existing plain ordinary telephone (POTS), the cell formation would preferably take place within the SIUs.

2. SUBSCRIBER INTERFACE UNITS

Type 1

The type used with cable TV systems would receive input signals and produce output signals in the frequency bands normally used by the cable TV system. For example, most cable systems use the frequency range of 5–30 MHz for upstream (toward the head-end) signals. Downstream digital signals would usually be sent above the normal TV frequency range. This is a function of the particular cable TV system and would likely be in the 400–1000 MHz range.

Type 2

A second type of SIU is for use with twisted pair telephone lines carrying high data rate digital signals.

The telephone industry is experimenting with methods of sending high data rate signals in the 1–6+ Megabit/sec. range over short distances using existing copper pairs. This technique is called Advanced Data Subscriber Link (ADSL) which provides one way service on a single pair. To provide bi-directional operation the directionality is reversed after the transmission of each cell packet. This technique is sometimes called "ping-pong" transmission. The primary objective of the use of ADSL by the telcos is the future transmission of one channel of video on demand to houses using existing telephone systems and in-house wiring. With this system VHS quality movies can be transmitted using on the order of 2 Megabits/sec. The ADSL data rate is inversely proportional to the length of the twisted pair line. This system is said to be capable of sending 3 Megabits/sec. over a 2000 meter length of a twisted pair, or very approximately 6 Megabits/sec. over about 1000 meter length of a twisted pair. The SIU would, for example, if a 4 Megabit/sec. of capacity is available, use about 2 Megabits/sec. for a downstream digital movie plus another 2 Megabits/sec. for bi-directional ping-pong modulation. What is new in the present invention is the ability to allow ADSL technology to operate at the maximum rate without having to meet minimum rate requirements in every situation, thus allowing much wider use of this technology. This can be accomplished with the present invention because of the variable data rate compliant ATM channel.

3. UPSTREAM CELL CONCENTRATORS

The WAN serves large numbers of houses, in fact the system of the present invention can even serve those houses where the occupants have not subscribed to a cable TV service. To maximize the use of such a system and to make it competitive, the packet cells from each terminal device are interspersed to share a single upstream path, and avoiding collisions as those cells are combined.

In the present invention, each of a plurality of serial upstream channels feeds a separate double buffered serial to parallel converter with packet cells not containing valid information either being marked as such or not sent at all. The parallel portions of the converters are connected via gates to a data bus feeding a microprocessor (or hard logic) with the microprocessor checking each cell packet for reasonableness and sending each out in order of arrival. The microprocessor's memory acts as a buffer to avoid the effects of several cells arriving at the same time and is programmed to send each byte of the 53 bytes forming the cell to an output parallel to serial converter.

4. DOWNSTREAM CELL ROUTERS

The upstream and downstream paths in the present invention use essentially the same equipment. The major difference is in the downstream direction where each arriving downstream cell is sent on a path to reach different selected SIU terminal devices. To do so it is necessary to read a few bits within each cell to determine which outgoing downstream link is to be sent with the arriving cells.

A serial to parallel converter converts the serial signal into 8 or 16 bit wide words which are stored as bytes in the microprocessor's memory. Thus the microprocessor needs to examine only a small portion of the destination address contained within each cell packet. The microprocessor then takes that cell packet out of memory and sends that cell to the designated output parallel series buffer. There is a separate double buffer for each downstream channel or device so that one buffer is being filled while the other is being unloaded over a serial line.

When large numbers of users are addressed, downstream routers may be used in tandem where the higher the position in the hierarchy, the greater the speed requirement of the switching process. At the very highest speed levels, the Upstream Cell Concentrators and the Downstream Cell Routers use custom dedicated circuitry while microprocessor control can be used at the lower levels for cost minimization.

To maintain the maximum cell processing speeds it is desirable to minimize cell processing and in the present invention indiscriminate reading of the cell is avoided. Only that byte containing the branching routing information is read, and the remainder is ignored during processing.

Rather than re-compute a CRC (cyclic redundancy check) of each cell at each node in the routing process to avoid delivering defective packets, this function may be deferred except at the SIU or the individual Terminal Device. To accelerate the process, the end Terminal Device would look at the incoming cell and quickly match the physical address together with the hashed serial numbers of the sending and receiving devices, thus the probability of an error is kept arbitrarily low.

Since there is inadequate space within the conventional 53 byte ATM cell for delivery to specific Terminal Devices, this end address information is contained within some of the space normally reserved for payload.

5. NON-FIBER OPTIC TRANSMISSION LINKS

These consist of the traditional twisted pair cable and coaxial cable links that are used at the subscriber end of both conventional telephone and cable TV systems.

6. FIBER OPTIC TRANSMISSION LINK

The transmission sections of the system of the present invention that pass large numbers of cells use fiber optic transmission paths. In both the cable TV industry and in the telephone industry, fiber is being extended from the cable head-end closer and closer to the end customers. The present high cost of fiber-to-electrical signal conversion prevents direct delivery of fiber to the home, however as cost comes down it is expected that fiber will get closer and closer to the home. Until this point in technological evolution occurs it is necessary to use an intermediate link for the last half mile or so to the customer's premises. In the cable TV industry, coaxial cable is used, and in the telephone industry, twisted pair telephone lines provide the termination link to the customer's premises. Additionally, a number of new technologies are under consideration to increase the data rate of digital signals on twisted pair. The present invention assumes that megabit/sec. rates are in fact economically feasible on short (a kilometer or two) lengths or in-place twisted pair cable.

In the case of TV cable, the end tail transmission path to the home today uses analog frequency division multiplexing. Digital signals on the coaxial cable are transmitted as radio frequency carriers. Only a small amount of spectrum (5–30 MHz) is reserved for upstream signals in most cable TV systems. Thus, the frequency spectrum is reused in the system of the present invention to limit the density of signals going upstream. The point where this transformation is performed in the present invention is preferentially at the junction between coaxial cable and fiber optics.

Fiber optic cable is being extended deeper into TV cable systems to remove tandemly connected amplifiers to improve reliability and improve the quality and number of TV channels that can be carried. Additionally, the incremental cost of an additional fiber in a fiber cable is small. The present invention provides economical means for processing the upstream digital signals to connect to such fiber in an effective manner.

7. ASYNCHRONOUS TRANSFER MODE (ATM) INTERFACE

The use of the 53 byte Asynchronous Transfer Mode (ATM) cell is now a widely adopted universal communications standard building block. Over 100 companies have recently joined forces in a ATM Forum during the past year to define new ATM standards.

The present invention is unique in its use of an ATM cell directly to the SIU or to the end Terminal Device. Rather than processing a high data rate stream into ATM cells, the present invention starts at the Terminal Device to create and terminate cells at the outset. Since the assigned address field of the standard ATM cell is too constrained to carry the necessary detailed descriptive and routing information, this additional needed information is placed within of portion of that part of the cell normally reserved for payload transmission. As this end point routing information is invisible to the conventional ATM switches, these unique locally created cells may be transported from major communications sites to other major communications sites and then sent to specific end Terminal Devices without modification.

The present approach for handling packets where such additional capabilities are sought is to add additional headers to each packet or cell. This requires the device adding the additional headers to have significant storage and processing capabilities. And, this means additional complexity and the inability to use the existing standard ATM transmission network. Thus, the present invention trades off cell data carrying capacity for simplicity and speed of processing which does not present a significant problem since the incremental cost of data transmission is small when using fiber optics. This in turn allows significant saving in processing requirements and permits simpler system implementation, as will be seen below. To further minimize the amount of processing necessary, functions such as recomputing CRCs is avoided by end to end reasonableness checks of redundant information contained in each transmitted cell, e.g. the hashed serial numbers of the communication devices.

8. DIRECTORY COMPUTER

Another novel feature of this invention is the use of a single (but replicated for reliability and time savings in large systems) translation engine to convert called names or telephone numbers into physical addresses that are rubber stamped in each transmitted ATM cell.

In brief, when a call is set up, the first cell packet carrying the name or telephone number of the party being called is sent to the Directory Computer. The Directory Computer translates that information into the physical address of the designated recipient and returns a physical address cell packet to the calling Terminal Device. Thereafter each cell sent is "rubber stamped" with this address by the calling Terminal Device.

This arrangement permits the moving of Terminal Devices within the system and allowing the communications process to continue. This is the equivalent to handover and/or roaming as performed by conventional cellular telephone systems.

9. DACS NETWORK

Fiber optic trunks handling long distance digital telephone circuits are often routed via switches called Digital Access Cross Connect Switches (DACS). Unlike conventional switches which switch on a call by call basis, the DACS transmission paths change slowly, in terms of days or months between changes.

The world is evolving toward ATM switching, and DACS switches to handle virtual circuit ATM transmissions are said to be under development for a number of switch providers. Instead of full period circuits, ATM DACS switches handle virtual circuits by using the five byte header of each ATM cell passing through as the address path to be taken through each DACS switch. The actual paths do not change rapidly as in the case of the conventional DACS switch. The present invention thus connects this long distance fiber network by a plurality of interconnected ATM DACS. In the present invention the preferred ATM DACS switches have conventional DS1 or DS3 ports for connection to the existing telephone system as well.

10. POINT-OF-PRESENCE INTERFACE

It is an object of the present invention to create a path between any Terminal Device to any other Terminal Device and to connect to the existing switched public telephone networks through their Points-of-Presence (POP) to each other and to cable TV systems for voice and data transmission between any two subscribers on any or all of them.

Two factors that must be considered are cell delays through the system and signaling interfaces. The major transmission delay is caused in loading the cell buffer with voice or data samples needed to fill a whole cell. The maximum cell payload is 384 bits, however, some of this payload must be reserved for internal cell addressing as described above. As a reference point, the StrataCom IPX switch is a cell based telephone switching system that provides toll quality voice and uses 192 bit cells. At 64,000 bits/sec. PCM voice and 192 bits, the packing and unpacking delays are 192/64,000×2=384/64 or about 6 milliseconds.

Thus, overall delays up to 25 milliseconds or so are anticipated making it desirable to include echo cancellation or other echo reduction techniques in the POP interface. The POP Interface Unit would also translate the form of signaling to that used for the remainder of the switched public telephone network.

Given the extensive overview of the system of the present invention and the constituent component parts the discussion shifts to a discussion of the referenced figures.

Referring first to FIG. 27 there is shown a simplified block diagram of the system of the present invention with that system interfacing with two cable TV systems and a conventional telephone system. The heart of the interconnection of the various systems shown here is SONET ATM domain 50 with internal ATM DACS switches and fiber optic paths. There are four interfaces shown, B, C, D and K. B and D can be viewed as cable TV systems with B transmitting data to and from a wireless data terminal 12 and a cordless telephone of a design compatible with this system 12', and with D transmitting voice to and from a wired telephone 14. Interface C is in communication with Point Of Presence (POP) interface 58 which interconnects with one or more telephone systems and is shown here being connected to two standard telephones 66. Additionally, at interface K there is a directory computer which, as described above provides the "rubber stamp" physical address to each transmitted cell and thus generates the virtual path through domain 50 for each call. For example, if there is a call originating from telephone 14 on cable system D, the initial cell containing the name or number of the recipient is transmitted from A to D to K (the broken line path) for directory computer 54 to translate that name or number to a physical address which is then provided to cable system D for "rubber stamping" each cell sent from telephone 14. This "rubber stamp" prefix of the cells from telephone 14 provides the virtual path (the solid line path) through domain 50 for the call from telephone 14 to telephone 66. It should also be noted that with the system of the present invention there is no load on the system when cells are not being transmitted. This is due largely to the fact that the "rubber stamped" information on each cell instructs the individual ATM DACS switches as the cell progresses through domain 50.

Figure 16:
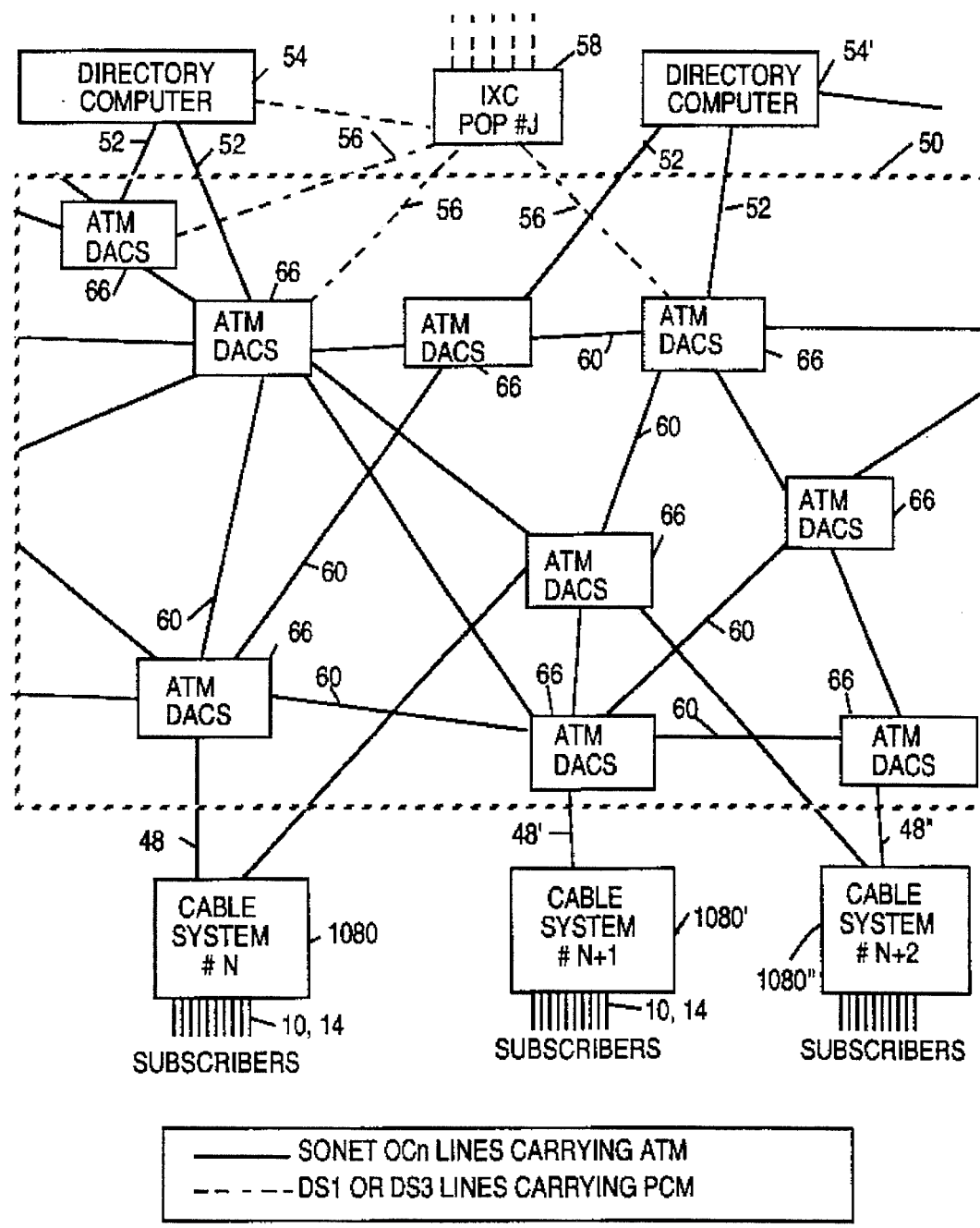
FIG. 16 is a block diagram of the ATM DACS switching system to interconnect multiple cable and telco systems as per the present invention.

FIG. 16 is an overall geographical system view which provides more detail than FIG. 27, discussed above. Here the SONET ATM domain 50 is shown in greater detail with a plurality of ATM DACS (Digital Access Crossconnect Switches) switches 66 interconnected in a net by a multiplicity of high speed fiber optic data lines 60. In this view there are three independent cable TV systems 1080, 1080' and 1080", interconnected with a first tier of DACS switches 66 in domain 50 for data transmission; this does not show the path for TV signal transmission to the subscribers, that is illustrated in the first cross referenced patent application noted above. Additionally, each of the cable TV systems is shown supporting a plurality of subscribers. Along the top of domain 50 there is two directory computers 54 and 54' for redundancy and heavy loads as discussed above, and IXC (inter-exchange carrier) POP 58 which connects to the standard telephone system. As can be seen in this diagram, the data between the IXC 58 and the DACS 66 and directory computer 54 to which it is connected is in the PCM (pulse coded modulation) format while all other data transmissions are in the ATM format.

It should be noted that the paths between DACS switches 66 are fixed, however the actual signal connections between them move very slowly, a matter of days. This is how most Telcos (telephone companies) are connected now, however, but cable TV systems are not now connected to each other. This is the data path not necessarily the path for TV program material.

This whole network of fiber optic links and switches 50 illustrated here can be considered one unit with everything transmitted in 53 bit ATM cells that each have a header that tells the cell how it is to be routed through the network. The first cell from a subscriber, as discussed above, will go through this network from the associated cable system 1080 to directory computer 54 where the called party identification (name or number) is translated to a physical address. The physical address from directory computer 54 is returned, say through path 52, DACS 66, fiber link 60, through another DACS 66, and through fiber optic link 48 to cable system 1080 and the subscriber's telecommunications equipment from which the first cell originated. Once the address from directory computer 54 comes back to the subscriber's telecommunications equipment, each subsequent cell of the transmission from the subscriber is rubber stamped with that information either in the subscriber's equipment of in the SUI (subscriber interface unit) not shown. This address stamp, as discussed above, instructs the individual DACS 66 in the path to transmit the cells in the path determined by directory computer 54. This path is thus described for future cells in the same transmission, e.g. if someone wants to call someone in an existing telephone system there would be an interexchange carrier point of presence 58 which may connect to MCI, Sprint, etc. All subsequent cells might go by a path such as 48, 60, 56 to get to IXC 58. The same process is used in the reverse direction.

Now suppose that a person on cable system N 1080 wants to speak to another cable TV subscriber on the same, or a different, cable TV system. The initial cell still goes to directory computer 54 which returns the "rubber stamp" address to the subscriber who originated the call. Each subsequent cell with the "rubber stamped" address will go up to the first tier of DACS switches 66 where it will be directed to the appropriate cable TV system for delivery to the designated recipient.

Incoming calls from a telco will be received at interface unit 58 and is sent to directory computer 54 where the received signal is first converted from PCM to ATM. Alternatively, this conversion could be performed in interface unit 58 in which case each of the lines in FIG. 16 which are shown carrying PCM signals would also carry ATM signals. Directory computer 54 then translates the name or number provided by the call from the telco to a physical address within the system of the present invention and provide that "rubber stamp" cell to wherever the PCM to ATM conversion takes place for the stamping of each subsequent cell with the address information as discussed above. As was also discussed above, there is more than one directory computer 54 shown here in case one fails, is not available, is some distance away, etc. Others steps such as setting-up the connection, providing the dial tone, ringing, etc., are also performed by the directory computer and those functions are straight forward and well known to those skilled in the art. What is considered novel here is the sending of an initial cell up to the directory computer to get an address stamp, sending a one cell address stamp back to the equipment that originated the call, and using that "stamp" to direct subsequent cells of the transmission.

FIG. 22 expands still further on the network diagram of FIG. 16 to illustrate how simple the actual routing of cells through network 50 actually is. Here each ATM DACS switch 66 is shown having an "UP" section and a "DOWN" section. Assuming that a call has originated from the first cable TV system 1080, the "UP" section of the first ATM DACS switch 66 where the header of the ATM cell is examined and the switch is instructed direct the cell to come out on line 8. The cell is then received on line 2 of "UP" section of the next ATM DACS switch 66. The first cell being transmitted it is directed to directory computer 54 coming out on line 5 and in on line 3 of the next ATM DACS switch 66, and out on line 6 to directory computer 54. Given this network of ATM DACS switches, all that is need to define the necessary path is these three numbers. Thus, it can be seen that it does not require a lot of address space.

Another view of the ATM DACS switching network 50 is shown in FIG. 23*a*. Here in the sonet fiber domain 50 there is shown semi-permanent virtual paths. One from the first cable TV system 1080 to directory computer 54 (shown as a light broken line) for the first transmitted cell to obtain the "rubber stamp" cell, and the second virtual path from the first cable TV system 1080 to the top POP interface unit 58 (shown as the heavy broken line) as the path for each "rubber stamped" cell in the transmission. Unless these paths are occupied by other traffic, or there has been an equipment failure, these paths will be the pre-connected path for all traffic between the identified units for the present and future data transmissions.

FIG. 23*b* is a table that illustrates when the translation by the directory computer is necessary for calls between various systems. Note that POTS stands for "plain ordinary telephone system" and COM21 is the designation for the system of the present invention. Thus, if the call is from POTS to POTS the call never comes into the system of the present invention. If the call is COM21 to COM21 it is entirely within the present system and name/number translation is required. If the call is from POTS to COM21 a translation is required. And finally, if the call is from COM21 to POTS a translation maybe done but is probably not required if the COM21 user has the POTS telephone number which will generally have a different format than the identification name/number used on the COM21 system. It is envisioned that in the COM21 system the user can select his own identification string so long as it has not already been assigned.

FIG. 1*a* is a block diagram of the overall system of the present invention that emphasizes the details of the up and down stream features of one cable TV system 8. In this figure there can be seen in the lower right, the ATM DACS interconnection network 50 with a directory computer 54 and a point of presence interface (POP) 58 as discussed above with respect to FIGS. 16, 22, 23*a* and 27 where the DACS network 50 was emphasized. On the left side of this figure there is depicted two wireless terminal devices 10 and 12 which interface with the SIU 16 through what has been identified as the crypto domain 19. Since the wireless devices broadcast the data that they are sending through the air as radio waves the crypto feature is provided to ensure privacy. There is also shown a wired terminal device 14 which is connected to SIU 16 by a traditional twisted pair 22. Since the wired device is not broadcasting the data which it is transmitting, encryption is not routinely considered necessary.

Within cable system 8, of which SIU 16 is a part, there is shown a non-fiber optic interface domain 18 which connects each SIU 16 in the subscriber's home to the rest of the cable TV system. As was discussed in the first listed patent application in the cross-reference section above, the upstream and downstream signals in a cable TV system are in two different frequency bands with the bandwidth of the upstream bandwidth being very limited. Thus it is necessary to have separate circuitry for the up and down stream signals. Additionally, while this figure only shows one SIU 16 connected to the up and down stream circuits of cable TV system 8, there are in practice a plurality of SIUs connected to this circuitry thus we have the additional problem of ensuring that cells being transmitted through the cable TV system 8 do not hit at the same time. This is potentially a greater problem in the upstream direction since the bandwidth for that transmission path is much narrower than for the down stream transmission path. Thus, provision is made to buffer the upstream signals that originate from various subscribers to ensure that one does not "overwrite" another. To reduce the costs of construction of the system each of the upstream and downstream paths are implemented with a low level and a high level unit. In the upstream direction there is low and high level cell concentrators 20 and 32, respectively, and in the downstream direction there is low and high level cell routers 24 and 34, respectively, with the high level of each connected by fiber optics to ATM interface 42 and the low level of each connected by coax cable to the SIUs in the cable TV system.

In the upstream direction the transmitted cells are packetized with the two levels with the lower level running at say 2 Mbits/sec. and the high level running at say 20 Mbits/sec. In the downstream direction the two levels may be running at 20 Mbits/sec. versus 150 Mbits/sec. The upstream path pulls in cells from the various SIUs and downstream path separates the cells and delivers them to the appropriate SIU. The switches in the ATM interface 42 are a little different for the upstream versus the downstream direction since in the downstream direction they must also select which route to send it so that it arrives at the correct SIU. Coming down there are packets of cells that are coming down at 150 Mbits/sec. Then the packet is delivered at 2 Mbits/sec. after it is buffered. The function described here is either done at the head-end of the cable TV system, or at some intermediate point, depending on the number of subscribers, not at each SIU.

FIG. 1b is also a block diagram of the present invention which provides more emphasis on the non-fiber domain and the plurality of feeder and drop cables, and taps to the individual subscribers, both with and without SIUs.

FIGS. 5, 6a, 6b and 8 provide details of the SIU of the present invention.

Figure 5:
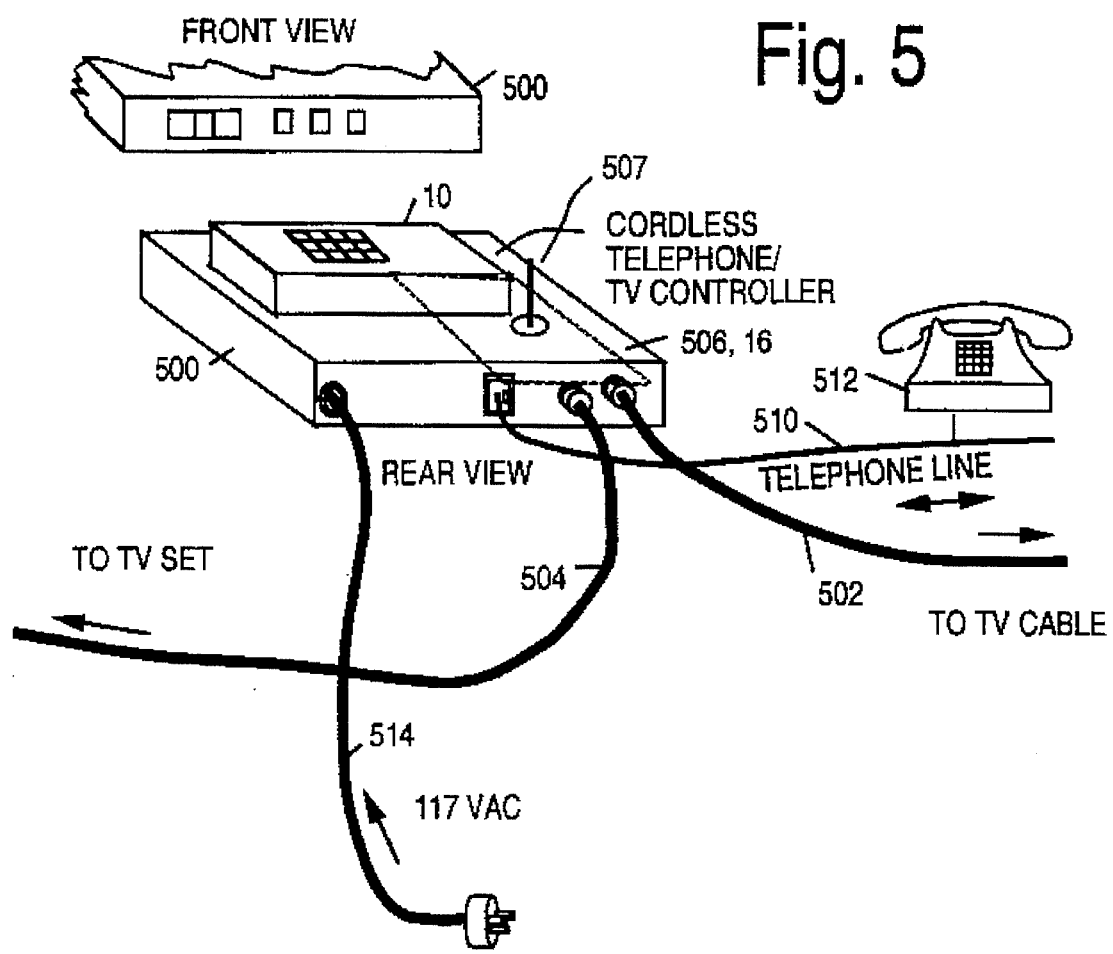
FIG. 5 is a simplified perspective view of the subscriber interface unit of the present invention.

FIG. 5 is a simplified perspective view of SIU 16, a cable TV system as modified for the present invention. In this figure there is shown the AC power cord 514, the in-coming cable TV cable 502, a connection to the internal house telephone wiring 510 (discussed in the second listed cross-referenced patent application in the cross-reference section above)with a wired telephone 512 connected thereto, and the standard controls for channel selection and on/off 10 and 500. To modify the standard SIU 16 for use here a card is added inside the box with a small antenna 507 for wireless communication with various types of devices as will be discussed more fully below.

Figure 6A:
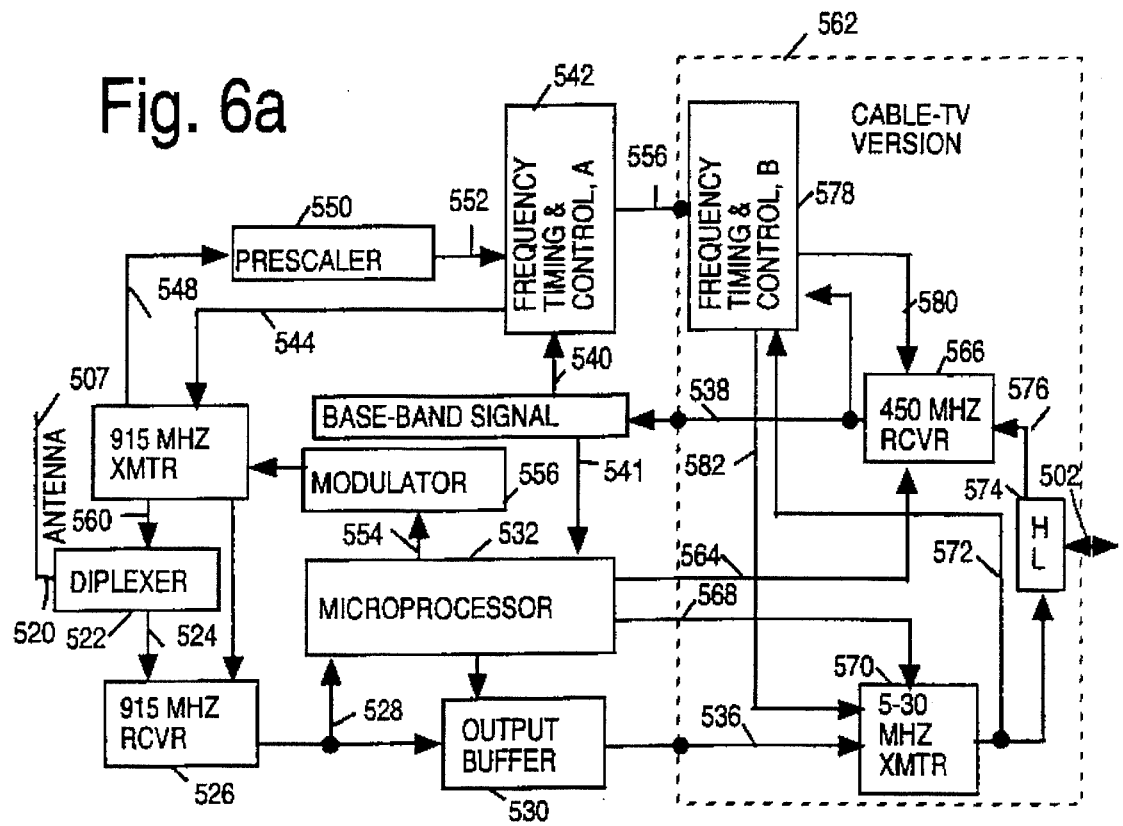
FIG. 6a is a simplified block diagram of the subscriber interface unit of the present invention for use with cable TV systems.
Figure 6B:
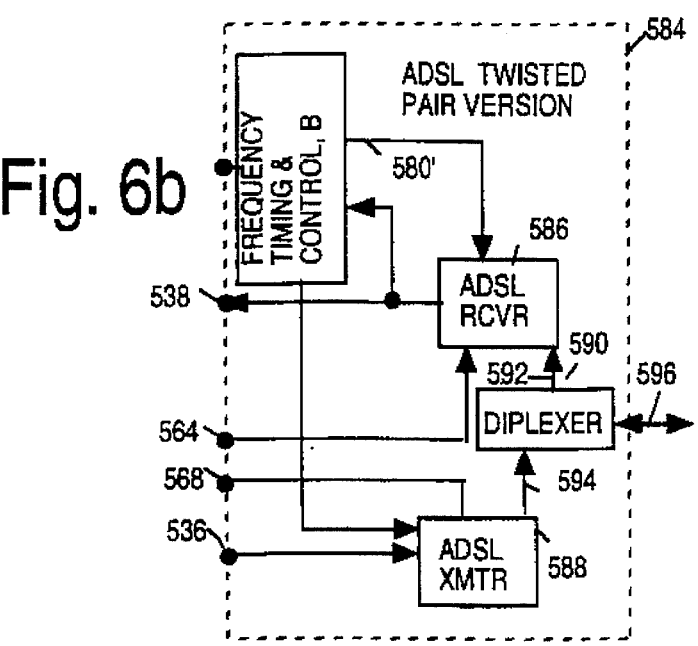

FIGS. 6a and 6b are simplified block diagrams of the internal circuitry of SIU 16, including the circuitry of the added card discussed above to provide the added functions necessary for the present invention. FIG. 6a is the cable TV version of SIU 16 with the cable TV drop cable 502 feeding the signal into high/low filter 574 where the high frequency TV signals and downstream data signals are separated from the low frequency upstream data signals.

For purposes of this discussion we will start with the downstream signals and assume that the TV signals have already been striped away as discussed in the first identified cross-referenced patent application in the cross-reference section above, and for purposes of discussion we will assume that the downstream data signal is at 450 MHz, and in the upstream direction the signals are in the range of 5–30 MHz. The 450 MHz signal is received at 566 with its data rate establishing a timing reference at 578 and forming a base-band signal at 540 which microprocessor 532 uses to modulate transmitter 560. Transmitter 560 transmits data signals from antenna 507 to various wireless devices when the data address (as discussed below) identifies the recipient/sending device as a wireless device. If the recipient/sending device is a wired device, the signal is placed on the in-house telephone wiring from receiver 566 in a path not shown here. This circuit also receives signals from wireless device via antenna 507, but it can not receive and transmit at the same time and therefore is referred to as a "ping-pong" circuit. It is the job of diplexer 522 to prevent the transmitted and received signals from mixing, one with the other. The entire operation of this circuit is controlled by microprocessor 532 with the upstream signals going through output buffer 530 before being applied to transmitter 570 as an initial buffer to prevent various upstream cells from the same SIU from hitting at the same time.

The circuit 562 is provided to maintain frequency lock. The downstream signal is being used to modulate by a digital 2 Mbits/sec. signal with the 2 Mbits/sec. signal being peeled off and used as the timing to lock everything on frequency. So that the modulation itself becomes the reference signal.

FIG. 6b shows a substitute circuit 584 for circuit 562 of FIG. 6a with circuit 584 for use in an ADSL (Advanced Data Subscriber Link) or HDSL (High Data Rate Subscriber Link) twisted pair environment instead of a cable TV environment. This is TELCO technology for sending Mbits/sec. over a twisted pair line. What is unique about our system is that the present technology in the telephone industry designs this equipment to send a fixed frequency rate signal and the present invention can use it for a variable signal rate. The problem is that not all existing wiring installations are acceptable for ADSL or HDSL. If the system has a long piece of wire with bridge taps it is much more difficult. The concept of the present invention is not sensitive to the data rate, whatever the data rate is the present invention can use it. That is important here since there is a variable data rate in the present invention since data cells are being sent and received. This is a method for handling the use of fiber optics and twisted pair on a telephone circuit. With the present invention it is possible to combine these two on one system.

Figure 7:
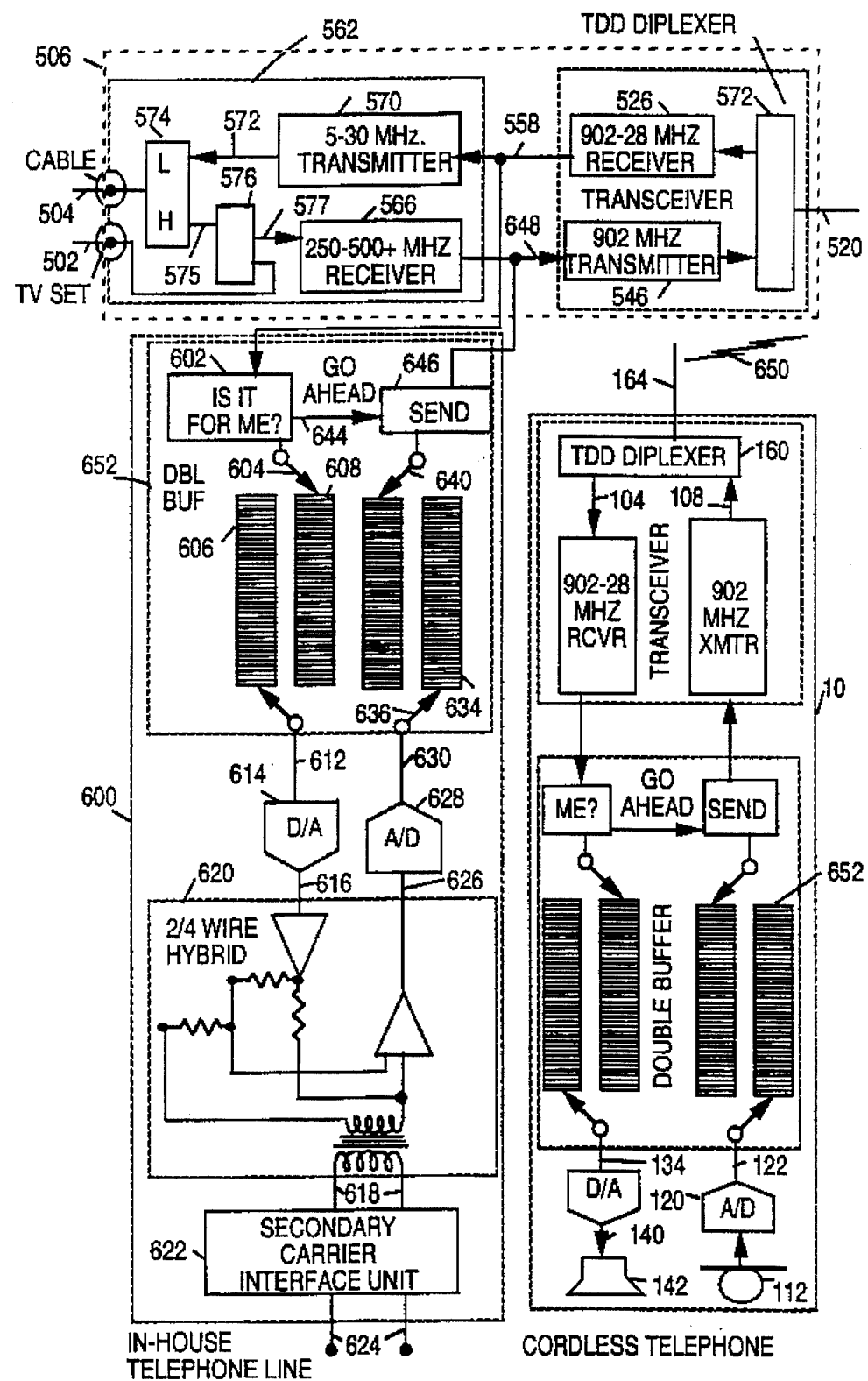
FIG. 7 is another block diagram of the subscriber interface unit of the present invention illustrating the interconnection thereof with the subscriber's in-house telephone wiring and with a cordless telephone of the present invention.

FIG. 7 is another view of the subscriber interface unit (SIU). In the upper left the signal on TV cable 504 is received by the high pass section of dual filter 574 with the TV signals being separated from the incoming data signals at 576 with the TV signal going to the TV on line 502 while the incoming (downstream) data signals are applied to receiver 566. If the address of the received data signal is for the SIU, then it is assumed that it is for a device that is connected to the SIU via the in-house wiring. In that situation the signal will be directed to the blocks on the left side of this figure. If the address is for an individual wireless device then that signal will be applied to transmitter 546, delivered to diplexer 572 and then radiated by antenna 520 for receipt by antenna 164 of any wireless device within range. Before continuing with the lower portions of this figure, the upstream data signal to transmitter 570 either comes directly from within the SIU from a device connected to the in-house wiring or from a wireless device via antennas 164 and 520, diplexer 572, and receiver 526. From transmitter 570 the upstream data signal is applied to dual filter 574 and is passed by the low pass section and placed on drop cable 504.

In the lower part of this figure the handling of the cells of data is particularly illustrated. On the left side of the figure the downstream signal is received by block 602 where the question is asked "Is it for me?". At this point in the circuit the header address of the cell is being examined to determine if the address matches that of the SIU. If the address matches the SIU can either send or receive cells. At this point the cells are alternately either read into or out of the corresponding double buffers 606, 608, 632 and 634. The incoming cells are then read alternately from buffers 606 and 608 by D/A 614 and then applied to the in-house wiring via 2/4 wire hybrid 620, isolation transformer 618 and secondary carrier interface 622 (this interface is the subject of the second of the references listed in the cross reference section above). In reverse, an outgoing or upstream cell is applied to A/D 628, buffers 632 and 634, send switch 646 and then to transmitter 570. If the incoming signal is a poling signal, "is it for me?" and it says that it is your turn to send, the SIU sends a signal saying go ahead. Note switches 604 and 612 are always connected opposite buffers, as are switches 630 and 640.

The right side of this figure shows the wireless device, in this example a cordless telephone, working together with the SIU. The same signal is now radiated between antennas 520 and 164 and is picked up by time division diplexer 160 and receiver 104 and transmitter 108. Again the address header of the cell is checked to see if the address of the received cell matches the address of the wireless device. This is necessary since multiple wireless devices of the same and different subscribers can be within range of any SIU. If the addresses matches the wireless unit operates in substantially the same way as the portion of the SIU on the left except that it comes out of the cordless telephone minus the four wire conversion and with the speaker and microphone 142 and 112, respectively.

Figure 8:
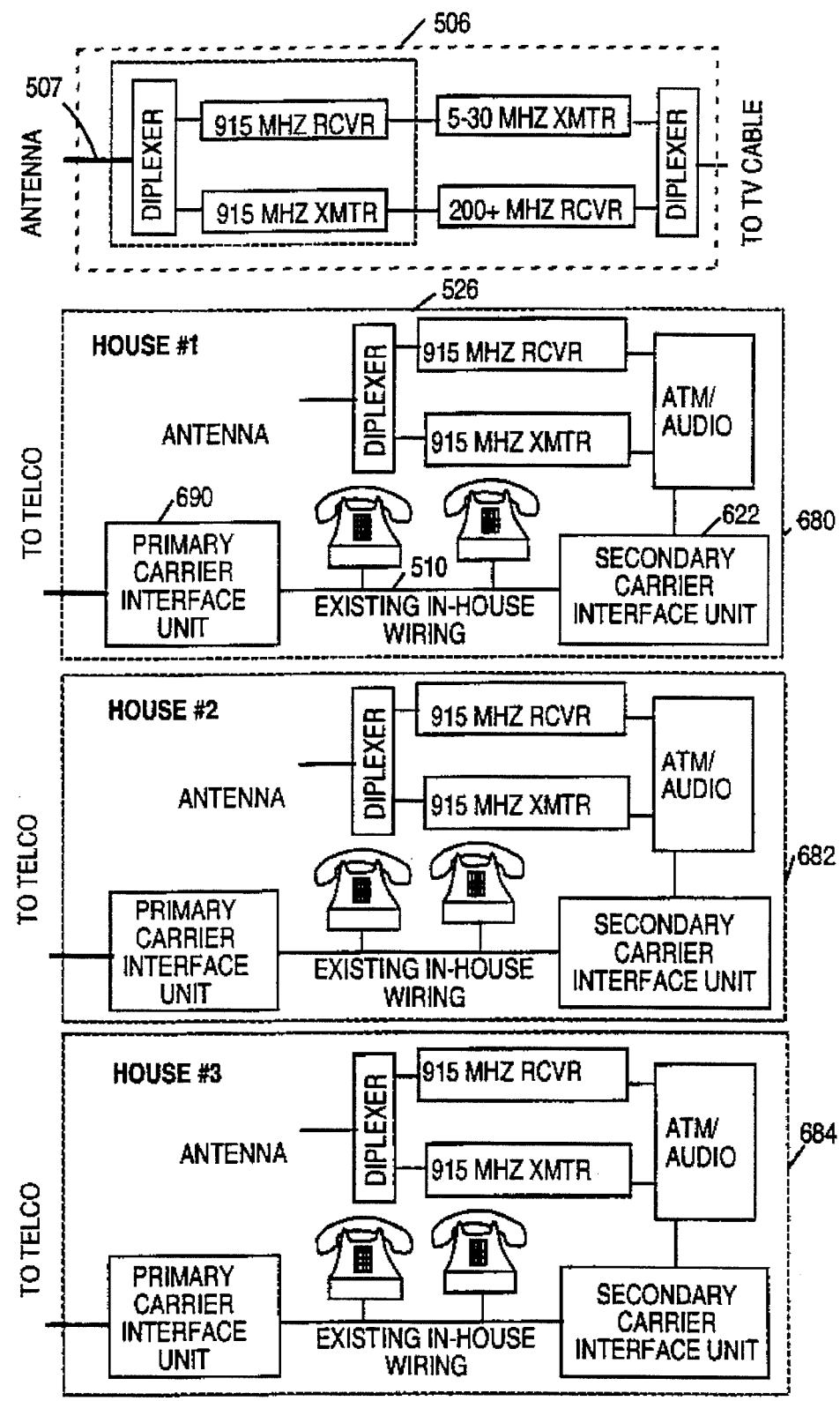
FIG. 8 is a block diagram to illustrate the interconnection of the in-house telephone wiring of users who are not cable TV subscribers.

FIG. 8 illustrates how the present invention also makes it possible for those who have decided not to be cable TV subscribers to also be able to take advantage of the use of the alternative voice/data communications capability offered by the cable TV system of the present invention, as well as conventional telephone service. Not being cable TV subscribers they will not have an SIU in there home. To accommodate them into the system of the present invention there is a secondary transceiver that connects to the in-house telephone wiring in their home so that when they use their wired telephone unit and enter the appropriate access code for out-going calls on the cable TV data transmission system, the call is broadcast to antenna 507 of an SIU 16 (see FIG. 5) in the immediate area in the home of a cable TV subscriber in the area. In FIG. 8 block 506 is a simplified block diagram of an SIU in the neighborhood. The homes of non cable TV subscribers are represented in this figure as House #1, #2 and #3, respectively. In each of these homes there is shown in block form, connected to their in-house telephone wiring, a secondary carrier interface unit, ATM/audio unit, a 915 MHz receiver and transmitter, a diplexer and an antenna. The details of the primary and secondary carrier interface units are the subject of the seconded referenced patent application listed above in the cross reference section. A radio link in this configuration is between the SIU and the radio transceiver that is connected to the in-house telephone wiring in each of the illustrated houses, rather than a hard wire link or a radio link between a wireless device and an SIU, both as shown in FIG. 1a. Thus, while it seems to each of the suers of the cable TV communications system in each of the illustrated houses that they are using their wired telephone device in the usual way, their entire in-house wiring has been converted to a wireless device when in this mode. The actual operation of the units in these houses are similar to the wireless devices which are discussed below and the operation here will become clear at that time.

By designing the system of the present invention so that wireless devices can talk with any SIU, and not just the SIU of the subscriber. Thus, any user with a wireless device can roam and still use the system as long as he is within range of any SIU. Also, as is discussed more completely above, with the individual identification number of each wireless device of the present invention the user is also not limited to only the area of his own cable TV system.

Figure 2:
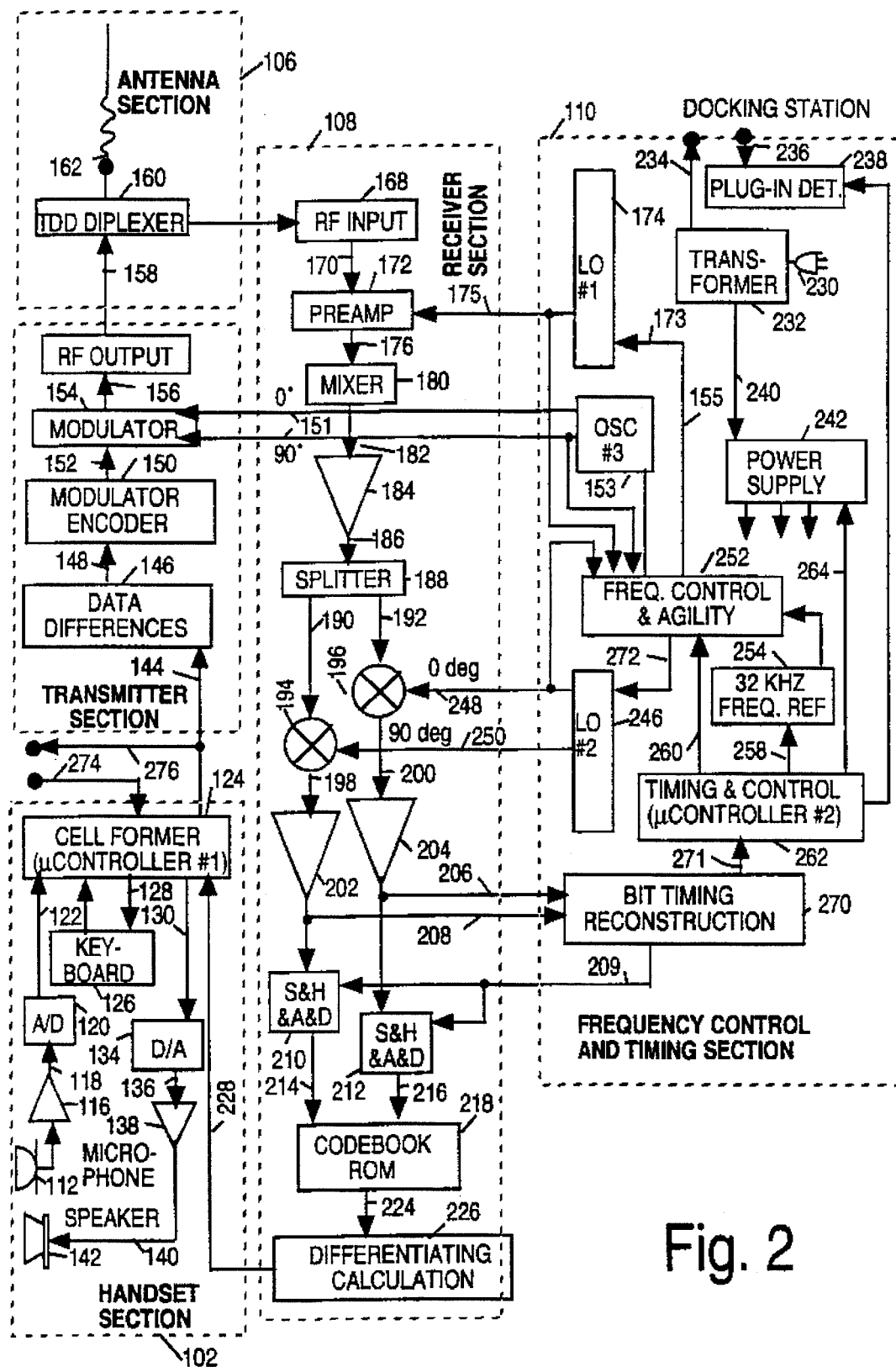
FIG. 2 is a block diagram of one embodiment of a cordless telephone unit for use with the present invention.

FIG. 2 illustrate a conventional cordless telephone for use with the present invention in a detailed block diagram form. In this figure the telephone has been broken down into five sub-sections: antenna section 106, transmitter section 104, handset section 102, receiver section 108, and frequency control and timing section 110.

Figure 3A:
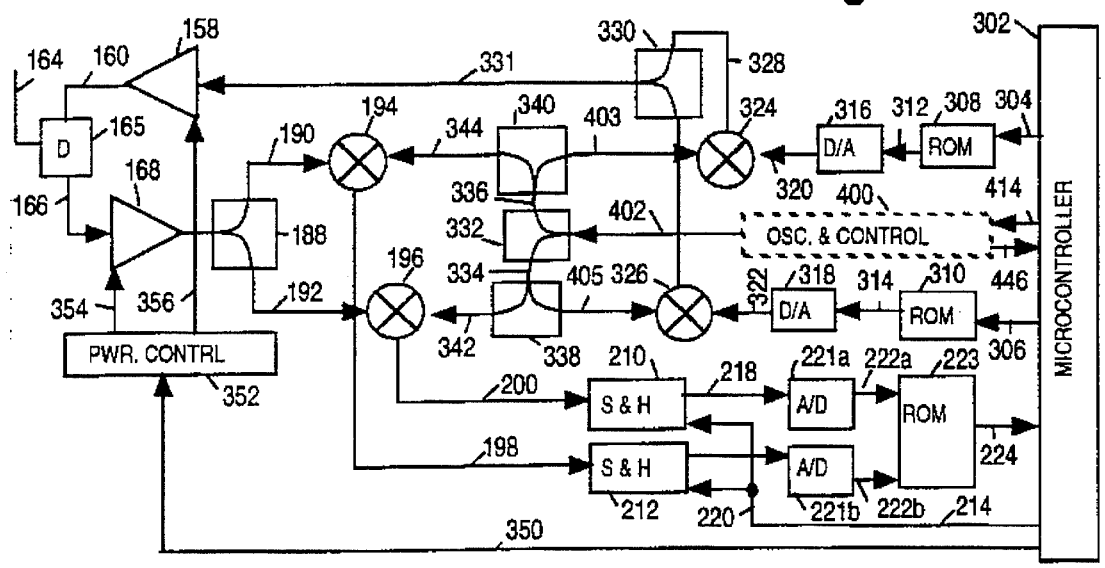
FIG. 3a is a block diagram of the internals of a second embodiment of a cordless telephone unit for use with the present invention.
Figure 3B:
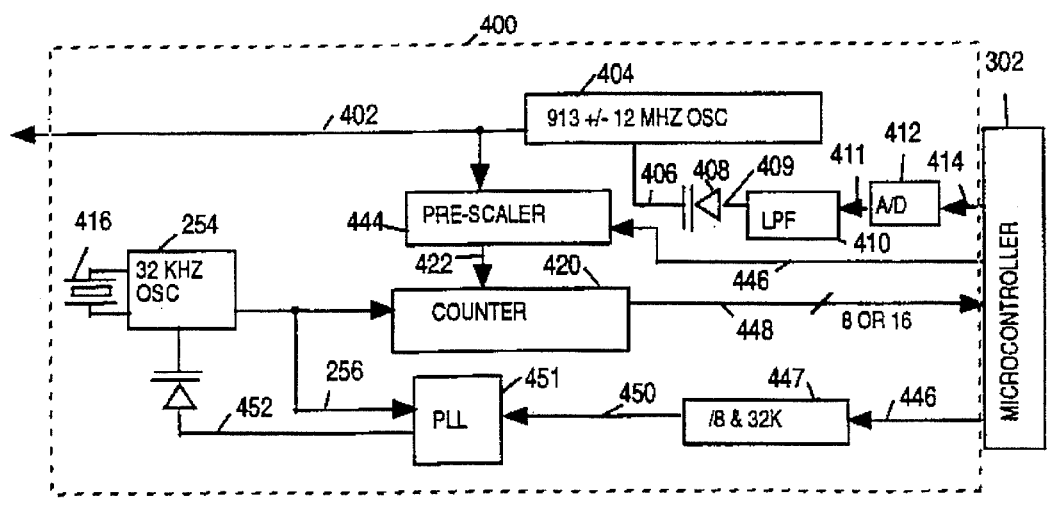

FIGS. 3a and 3b illustrate a form of a direct conversion receiver that performs the same functions as the implementation of FIG. 2 with only one microprocessor and fewer parts overall. The block diagrams of FIGS. 3a and 3b includes everything for the cordless telephone except for handset section 102. Microprocessor 302 of FIG. 3a however also performs the functions of cellformer microprocessor 124 of the handset section 102. This implementation has been broken into two figures with the details of the oscillation and control block 400 of FIG. 3a shown in detail in FIG. 3b. Direct conversion is where a local oscillator operates at the same frequency as the carrier frequency of the in-coming signal which requires the ability to match the two frequencies.

The general theory of operation relies on the fact that in this application the signal is coming down almost continuously and it has a fixed bit rate, so it is possible to lock onto it. Once locked onto, the signal can easily be tracked.

In this application the incoming signal is typically in the 902–928 MHz range with a fixed bit rate of 2 Mbits/sec. The oscillator and control section 400 includes a variable oscillator 404 with a nominal frequency of 913 MHz that can be adjusted to the frequency of the received signal. There is also a crystal 416 that controls a master timing oscillator 254 that operates substantially at 32 KHz. The 32 KHz oscillator is a low power device and can be operated continuously, even on battery power, while the 913 MHz is power intensive and for power saving reasons is pulsed in for about 1 ms every second.

The 32 KHz signal from oscillator 254 is applied to phase lock loop (PLL) 451 on one side and is counted down at the clock rate to match so that if there is any difference the frequency of oscillator 254 is slowly modified so that it locks and follows the 2 Mbits/sec. bit rate of the incoming signal. This adjusts very very slowly. Prescaler 444 operates in the 900 MHz range which takes a lot of power, so it is only pulsed on for a short time to provide the signal to counter 420 for the count function of the low frequency oscillator signal during the time that the correction is to be made, perhaps 1 ms of every second. Prescaler 444 is gated at 32 Khz providing a number, say a 16 bit number, which provides the correction to be made in oscillator 404. The equivalent of the carrier frequency is then on line 402 where it is used to either demodulate an incoming (downstream) signal or to modulate an out-going (upstream) signal.

Stated in other words, the oscillator is locked to the carrier frequency of the signal and that is used for transmitting a returning signal and is also used for receiving. The result is a slowly drifting analog signal that is sampled and converted to a digital signal from a look-up table. Because the signal is drifting the difference is used from measurement to measurement, so if there is a slow drift through the entire transmission it washes out.

Figure 4:
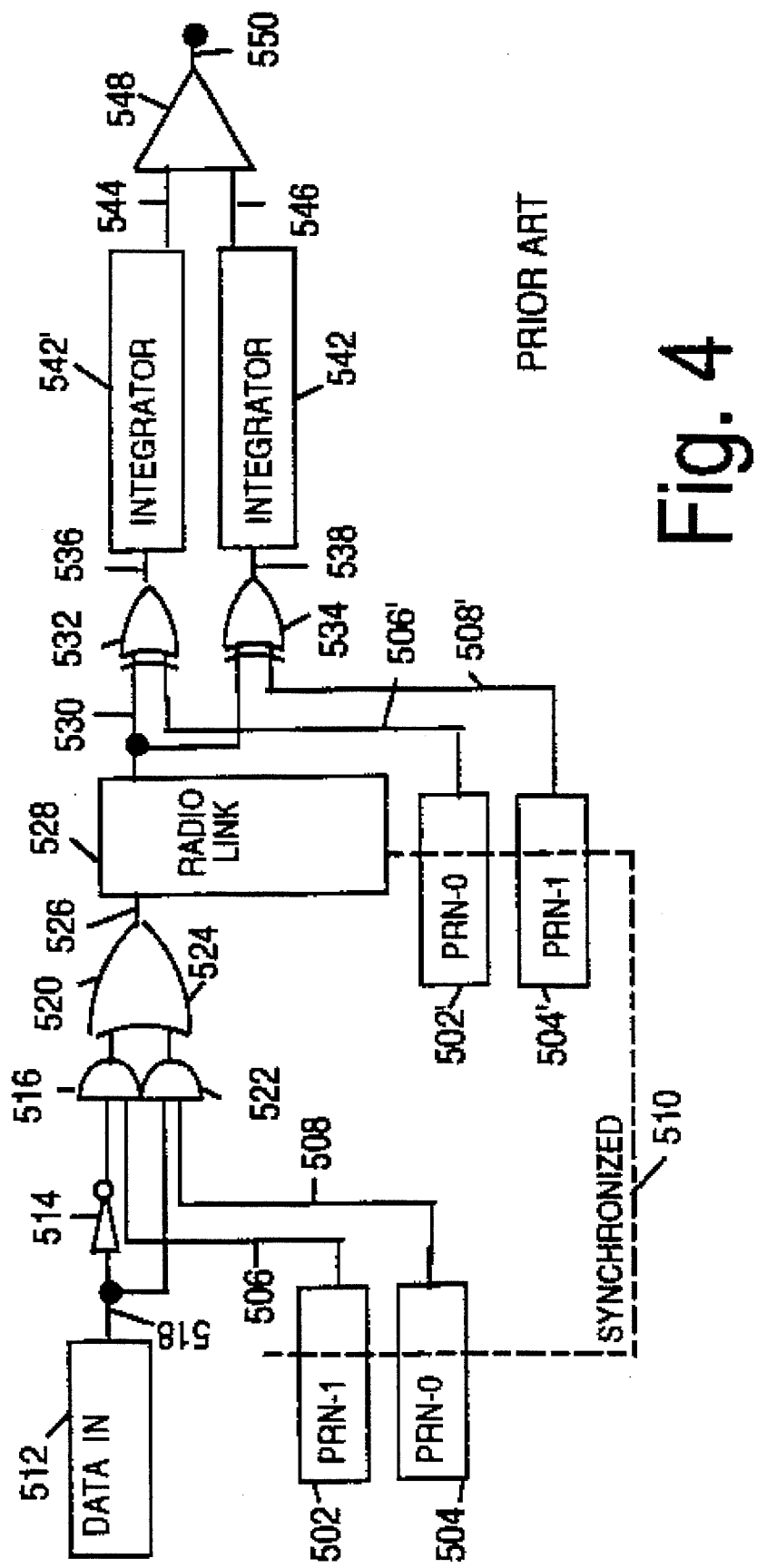
FIG. 4 is a block diagram that illustrates the prior art spread spectrum signal technique approved by the FCC for communication between the SIU and the cordless phone at a high data rate.

FIG. 4 illustrate the prior art spread spectrum signal technique approved by the FCC for communication between the SIU and the cordless phone at a high data rate. This is not the technique of the present invention, however the technique of the present invention has all of the characteristics of the spread spectrum signal. This has been discussed in the first of the referenced patent applications listed in the cross reference section at the beginning of this specification.

Since the system of the present invention transmits the data cells to and from different users on the same cables and fiber optic links it is necessary to have a way to maximize the traffic. This is done by giving preference to the devices that have been transmitting most recently while also monitoring those that have not been transmitting to see if they have any data to send. As was discussed above at least for the wireless devices it may be necessary to send a running signal so that the radio locks up and stabilizes. To be able to use the same cable for more than one transmission polling is used.

Referring to FIG. 9a the initial string of any signal is illustrated which has been designed to minimize the time used in each signal for housekeeping. Each signal initially includes a 12 bit (3 symbol) frame command 704 which instructs the system to do something, followed by a 12 bit (3 symbol) address string 706 to identify the local device being addressed for whatever reason established by the command code. Everything in this system has been described as being 4 bits per Hz, however, similar operation is possible with whatever bit rate might be convenient. At 4 bits per Hz each symbol includes 4 bits, which can represent up to 16 states. Thus 3 symbols can represent up to 48 states. In addition to the 24 bits (command and address) in the initial string of each signal, there is a leading symbol (4 bits) for the run-in time 700, for a 12.5 μsec. total at the data rate of 4 bits per Hz.

Thus the initial string of the transmit signal has three parts to it. The initial run-in period, followed by the frame command, and finally the address of the local device. Frame command 704 can represent different commands to do different things, e.g. one command might indicate that a message follows whereas another might indicate that the signal is a poll, and a third might indicate that the signal is a poll for a device that hasn't transmitted for a while. The address string represents the name or address of the local device which provides a capability of about 4000 device addresses.

FIG. 9b illustrates the polling mode where the signal only consists of the initial string and the method is to poll and listen, if nothing happens to poll the next device and listen, and so forth until there is a response from a device, or if there is no response from any of the devices to start over again. In FIG. 9b the space between the polling signals represents the listening time. So the polling is done rapidly unless a device responds that there is a cell to be sent which is 53 bytes long as discussed below as shown in FIG. 9c. Thus, this method gives priority to devices that have recently sent or received data. As can be seen by comparing the signal streams of FIGS. 9b and 9c, the period of time in which a device will respond when polled if it has a cell to be transmitted is considerably shorter than the listening period between pollings when there is no cell to be sent by the device that was polled.

Figure 10:
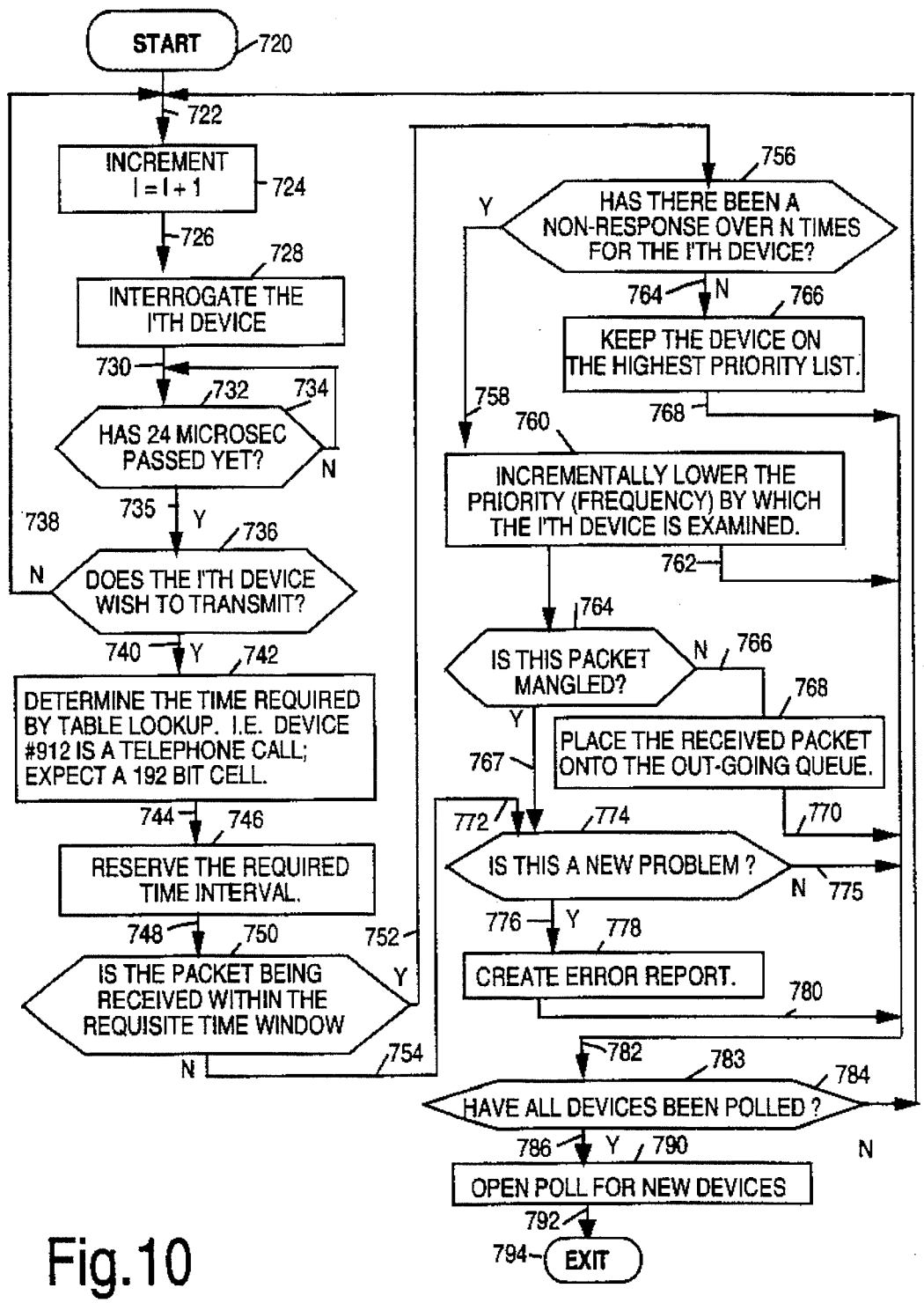
FIG. 10 is a flow chart illustrating the protocol for the end device servicing scheduling.

FIG. 10 is a flow chart of the polling method that was outlined above. This method in it's derivation includes several criteria, for example, as stated above devices that have recently transmitted or received cells are more likely to have a cell to transmit than devices that have been silent in the resent past, also it is know that if someone is using the telephone they are going to want to send a cell about every millisecond. So the polling method must listen for a cell from that device at that time. It is not necessary to go back to that device more often because it is not going to be able to come back more quickly than that. So the system can go do other things and by that time it should be ready to listen again to that device.

In FIG. 10, I, is initially set to 0 and then incremented by 1 in block (724) and the i$^{th}$ interrogated (728). A listening period is then generated by time-out 24 μsec. period, in this example, (734). After the completion of the time-out period the question is asked "Does the i$^{th}$ device wish to transmit?" (736). If no, I control returns to 724 and i is again incremented and the interrogation continued. If the i$^{th}$ device does want to transmit then control moves to block 742 where the time for the response from the device is determined by looking in a look-up table for the time necessary for the function that the device is performing, i.e. a telephone call will result in a 192 bit cell to be transmitted. That time interval is then reserved (746) and a test is made to determine if the packet is being received within the requisite window (750). If no then control moves to block 774 which will be discussed later, if yes control proceeds to block 756 where another test is performed. This test is whether there has been a non-response to a poll of this device more than N times. If no, then the device is kept on the highest priority list (766) with control going to block 783. If yes the priority or frequency with which that device is polled is incrementally lowered (760) with control then going to block 783 if the resulting lower priority is the lowest possible, or if the priority remains above the lowest level then control goes to block 764. At block 764 the packet is examined to see if it is mangled. If not the out-going packet is placed in the out-going queue (768). If it has been the question is asked is this a new problem (774), if not control goes to block 783, if yes an error report is created (778) and then control goes to block 783. At block 783 it is determined if all of the devices of that priority level have been polled, if no control returns to block 724 to increment the device number, if they have then control goes to block 790 to open polling to other devices with the next lower priority level. Then polling continues until all devices have been polled and then the priority level is reset so that devices with the highest priority level are polled each time and as the priority level decrees the devices are polled at an ever decreasing rate.

Figure 11A:
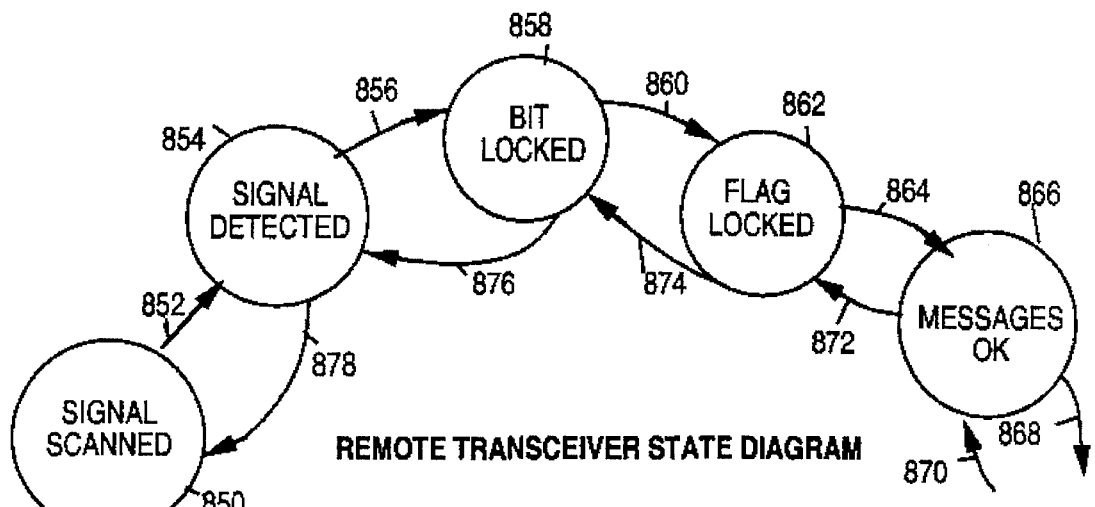
FIG. 11a is a state diagram illustrating the remote transceiver state pattern.
Figure 11B:
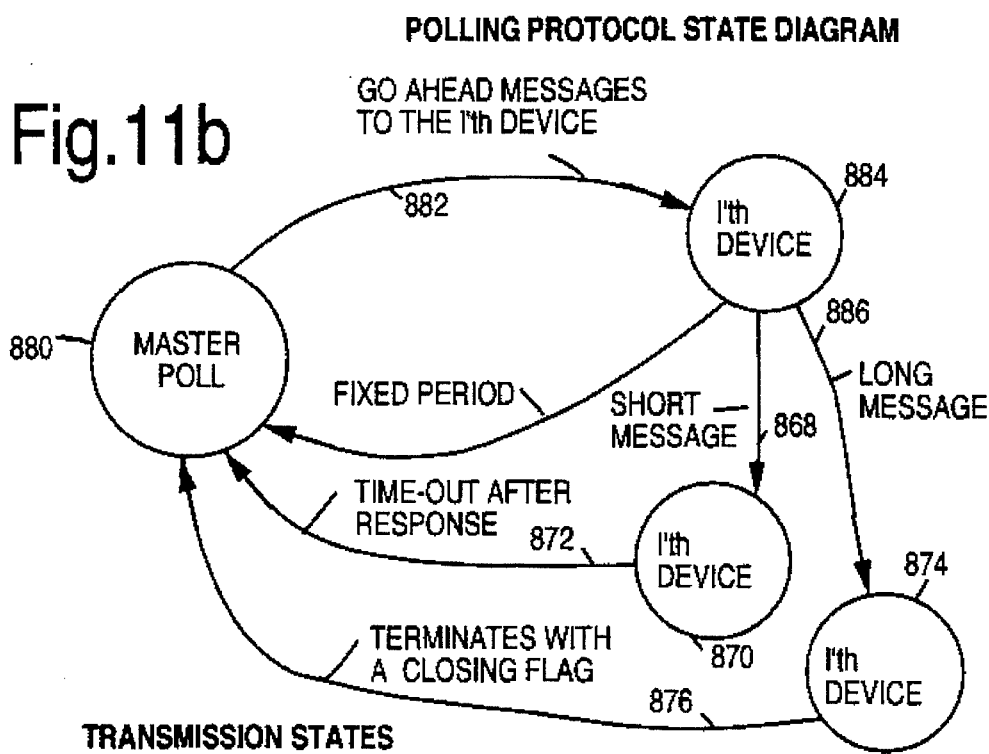
FIG. 11b is a state diagram of the poling protocol of the present invention.

FIGS. 11a and 11b are state diagrams for the remote transceiver states and of the polling protocol states, respectively. In the case of the remote transceiver, when all of states in the chain have been progressed through then the transceiver is a good device. In the polling states note that there is either a short message or a long message. The short message is a housekeeping message, whereas the long message is a complete 53 byte packet.

Figure 12:
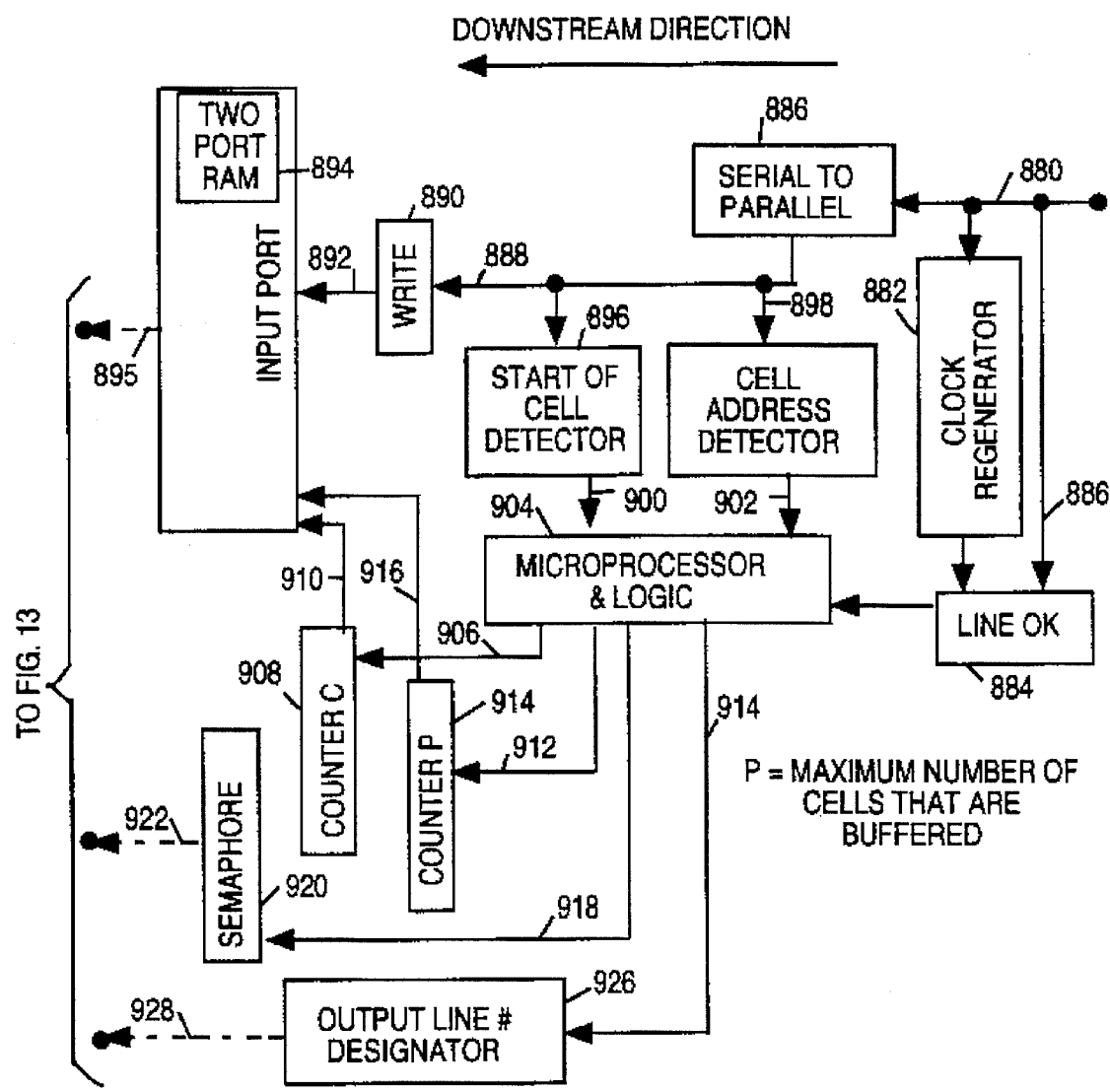
FIG. 12 is a block diagram that illustrates the initial processing of downstream cells.
Figure 13:
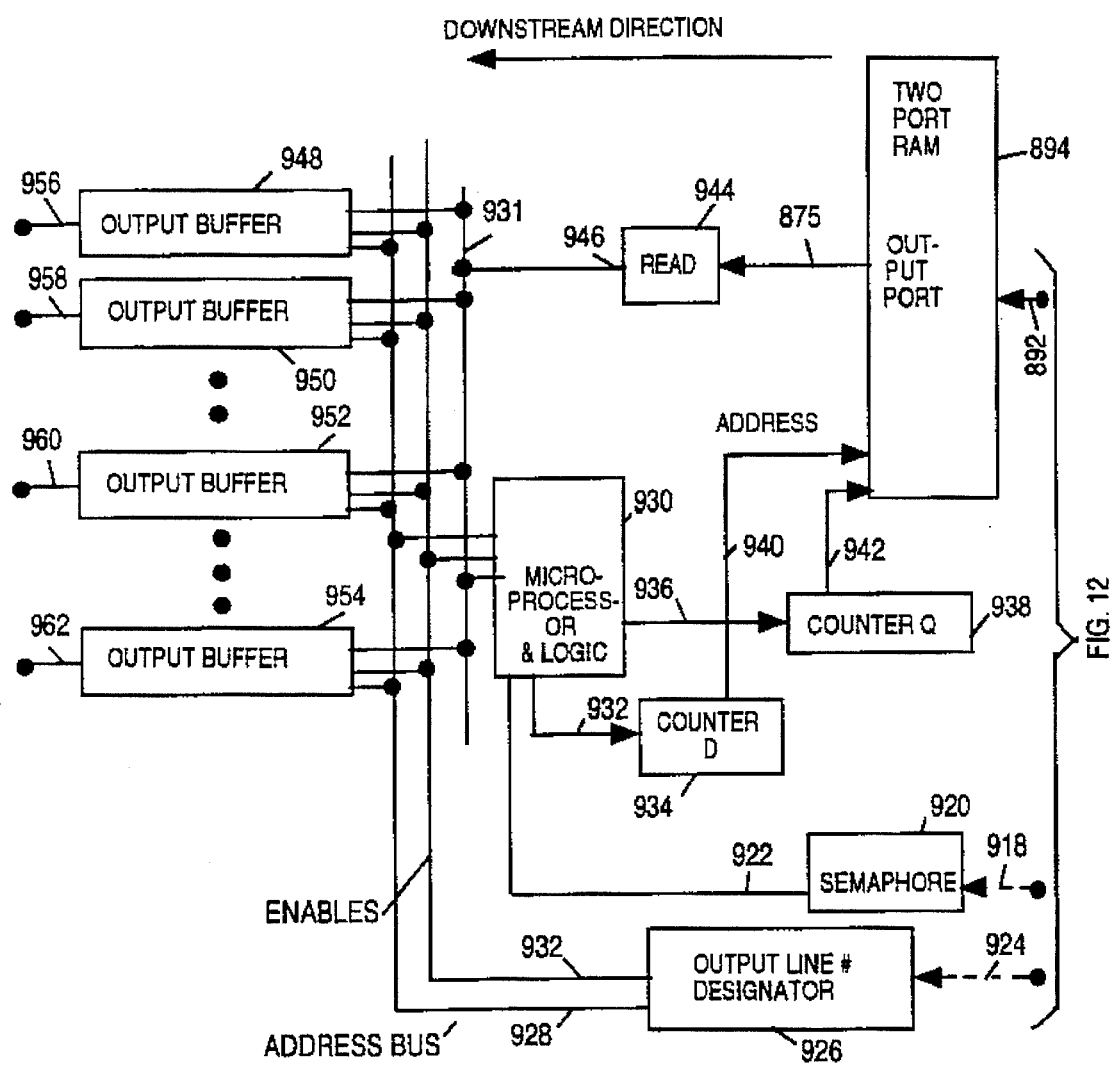
FIG. 13 is a block diagram that illustrates the delivery of the cells following treatment as in FIG. 12.

FIGS. 12 and 13 are a pair with FIG. 12 illustrating the initial processing of downstream cells and FIG. 13 illustrates the delivery of those cells so that they do not hit on each other. On the right side of FIG. 12 the high speed downstream signals arrive on line 880 at 150 Mbits/sec. for purposes of this example. The downstream signal is applied to serial to parallel converter 886, clock regenerator 882 and line OK register 884. The serial to parallel conversion 886 is done to reduce the data rate by a factor of 8, or 16, to a data rate that is easier to handle. Also the clock is picked-out and cleaned up by regenerator 882, and if the line looks good and is working the line OK flag 884 is set and provided to microprocessor and logic 904. The serialized data on line 888 is applied to cell address detector 898 and start of cell detector 896 to also provide that information to microprocessor 904. The signal from the start of cell detector 896 provides the necessary information as to where in the signal the cell address is to occur. If the cell address of the incoming data matches the address of the receiving device microprocessor increments counters 908 and 914 as the cells arrive to provide the address of RAM 894 where the data is to be written and sets semaphore 920 when there is something in RAM 894 for the circuit of FIG. 13 to read from RAM 894, as well as initializing output line # designator 926 which corresponds to the number of the designated recipient of the cell. The data on line 888 also is applied to write buffer 890 for writing into two port RAM 894. Note here that a two port RAM is one wherein the input and output ports are essentially isolated from each other, i.e. the write function and read functions are separately controlled and can occur at different times and to and from the memory locations in differing orders. Two counters 908 and 914 are provided for the case where there are different messages so that one is the cell address counter and the other is the message counter so that similar cells are stored on related areas of RAM 894. Stated in simple terms, the circuit of FIG. 12 is listening to the downstream cells and if they are acceptable for what ever reason they are written into an area of RAM 894.

The second half to the circuit in FIG. 13 is for reading from RAM 894 and includes three blocks which have been repeated from FIG. 12 for convenience, RAM 894, semaphore 902 and output line # designator 926. If semaphore 920 has been set the reading process will begin, otherwise nothing will happen. Also an address is needed from line designator 926 which provides an enable signal on the enable bus for microprocessor 930 and output buffers 948–954, as well as a device address on the address bus to the same units. Once enabled, microprocessor 930 sets counters 934 and 938 to designate the area and records on RAM 894 that are to be sent to read buffer 944 and then sent to data bus 931.

FIG. 14 is the flow chart that illustrates the operation of the circuit of FIG. 12. The incoming signal is first checked to detect the start of the cell (988), if not this continues until it is detected. Once the start of cell has been detected counter C (994) is reset and the next word of the incoming cell is placed in location Y via the input port of the RAM (998). Next C is checked to see if it equals A (1002), if not control goes to 1016, if yes the local address bits are read (1008) and semaphore is set (1012) and control goes to 1018. In block 1016 C is checked to see if it equals 52, if not, control returns to block 998, and if yes control goes to block 1018. Block 1018 does a reasonableness check, if it does not pass there is an error exit (1022) and if it does control returns to block 988.

Figure 15A:
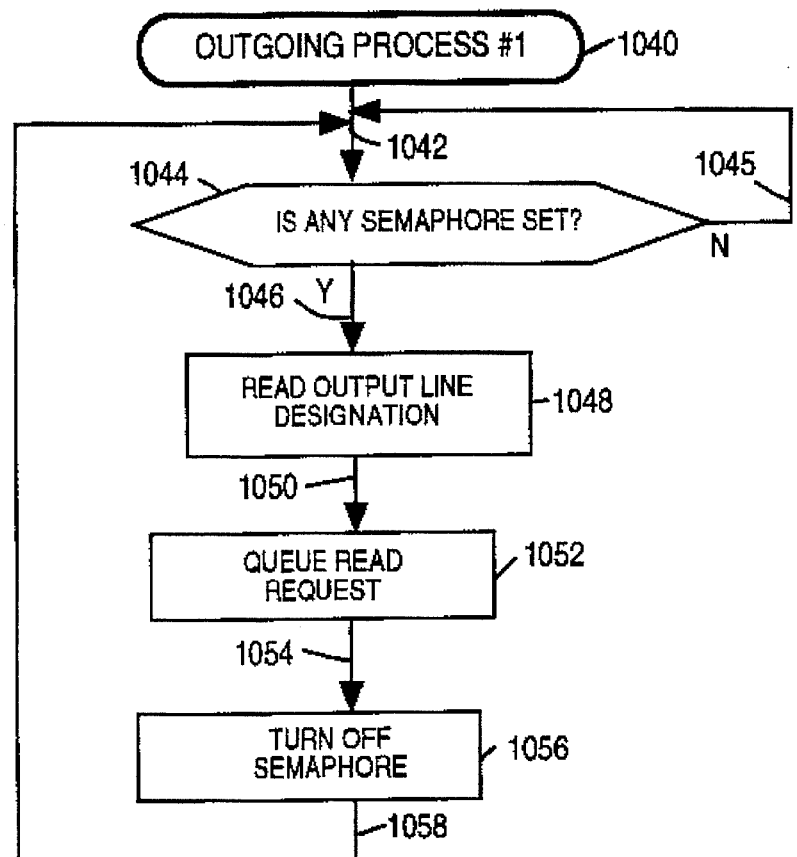
FIGS. 15a and 15b are flow charts which illustrate the different modes of operation for the circuitry of FIG. 13.
Figure 15B:
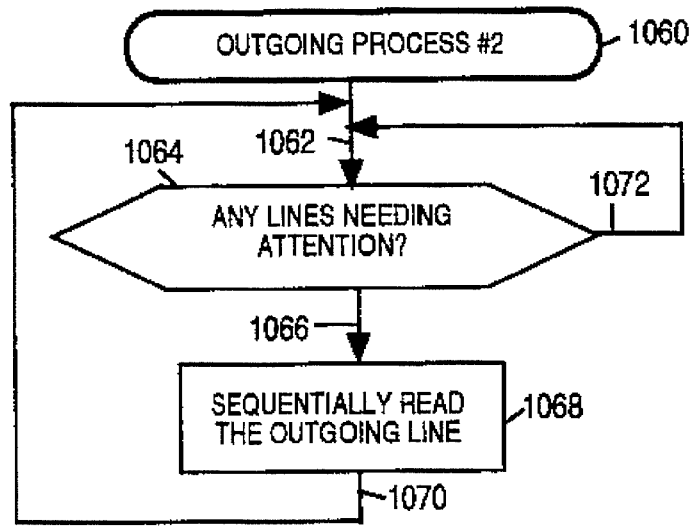

FIGS. 15a and 15b are flow charts which illustrate to different modes of operation for the circuitry of FIG. 13. In FIG. 15a a test is done first to determine if the semaphore is set (1044), if not the test is redo until it is detected as being set, if it is set control goes to block 1048. The output line designation is then read (1048) followed by a queue read request (1052) and then the semaphore is turned off (1056).

In FIG. 15b there is an initial test for lines needing attention (1064), if no the test is repeated until the test is positive, if there is a line needing attention the line is sequentially read (1068).

Figure 17:
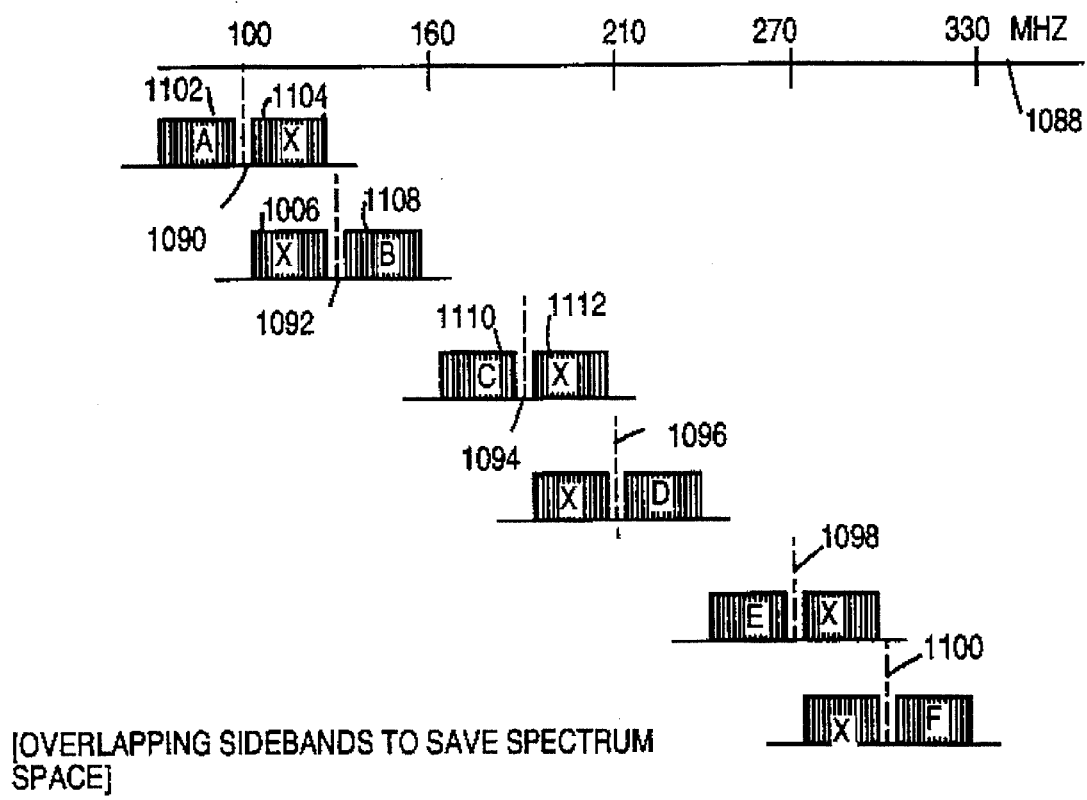
FIG. 17 is a representation of the overlapping sideband technique of the upstream data communications signals of the present invention.

FIG. 17 deals with that part of the network that is in-between the coax feeders and the fiber optics. The problem is that we have a limited up-stream bandwidth. The early generation cable systems there was a reserved upstream band of approximately 5–30 Mhz. To increase the capability of the system in the upstream direction it is necessary to multiplex the cells into carriers in the 5–30 MHz band.

Since there is only a limited upstream bandwidth available it may be desirable to free-up some of the available bandwidth as the signal cross section increases in the 5–30 MHz frequency range of each separate feeder amplifier. To do so the present invention provides a technique for heterodyning the upstream signals on each feeder cable associated with the same feeder amplifier into separate non-overlapping frequency spectra as shown in FIG. 17. Thus one of the functions of the multiplexer is to interleaf the signals from the individual feeder cables. This can be accomplished by allowing the upper sideband of one signal to overlap exactly with the lower sideband of the signal with the next higher center frequency, and so forth for each pair of adjacent signals. FIG. 17 illustrates this technique for six different signals from six different feeder cables. By doing so there will be interference between the overlapping sideband signals, however, since the information of each signal is the same in both side bands no information is lost. To be able to read the transmitted information the overlapping must be performed accurately so that the transmitted information can be read from the non-overlapped sideband of each signal. By using this process for all feeder cable bandwidths, the usable upstream bandwidth can be increased by a factor of 50%.

Since the present invention uses the overlapping sideband approach the center frequencies of the signals from each of the signal processors must be fixed with respect to each other so that the overlapping sidebands do not also overlap the sidebands that are not to be interfered with. This accomplished with a crystal controlled oscillator that feeds a splitter to precisely set the center frequencies of each of the signal processors. A signal at the selected center frequency for each of the corresponding signal multiplexers is applied to a first mixer in a phase locked loop. The output signal from first mixer is then applied to a low pass filter before being applied to a voltage controlled oscillator (VCO). The output of VCO is then feedback to the first mixer through a divider to correct for any error in the frequency of the output signal from the VCO.

The output of the phase lock loop (output of VCO) is then applied to a second mixer where that signal is mixed with the upstream signal from the corresponding feeder cable after having passed through a first bandpass filter. The output signal from the second mixer is then applied to a second bandpass filter. From the second bandpass filter the signal is applied to an attenuator. The output signal from each of the signal processors are each applied to a combiner for transmission future upstream in a parallel data stream via an electrical to optical converter, an optical separator and the fiber optical cable.

With an available bandwidth of 12 MHz for the upstream signals associated with each feeder cable, a channel spacing of 400 KHz yields 30 separate channels, and each of the 30 channels can operate at 1.5 Mbits/sec. and each is capable of supporting 12+ simultaneous telephone calls. This is equivalent to about 360 simultaneous telephone calls per feeder amplifier leg assuming a density of about 200 homes per mile of feeder cable, or about 1.8 simultaneous telephone calls per house. Based on today's usage, in practice, only about 10% of the residential users demand voice service at the same peak load instant or about 20% peak rate for businesses. Therefore, there is more than adequate capacity for voice services with the present invention. These estimates are based on toll grade voice data rates —32 Kbits/sec. ADPCM, and not highly compressed voice techniques at 8 to 16 Kbits/sec. being considered for some cordless devices which impair voice quality. Thus there is a considerable available capacity for data transmission which is likely to be the major application for this system.

The assumption of the above paragraphs is that the signals from each feeder cable section is lifted off and transferred to a fiber optic cable junction at the point where the fiber to the feeder cable joins the feeder amplifier. Thus the cross-section capacity increases, moving up the trunk of the transmission tree.

Next consider the privacy algorithm so that only the designated recipient hears the transmission whether it be in the up or down stream direction. FIG. 18b is a simplified diagram that shows two users, J and L, connected to the head end of a cable system by means of a feeder cable and drop cables with each of the drop cables coming off of the feeder cable through directional couplers 1154 and 1160, respectively. As can be seen from this diagram downstream signals can be seen to be received by all users connected to the same feeder cable via the individual directional couplers. However, in the upstream direction, do to the inherit attenuation in each directional coupler, the signal will only go upstream on the feeder cable and will be greatly attenuated at any of the other users served by the same feeder cable. The inherent attenuation is so great that the upstream cells can not be detected by the other users on the feeder cable. Thus privacy is particularly a problem in the downstream direction.

Figure 18A:
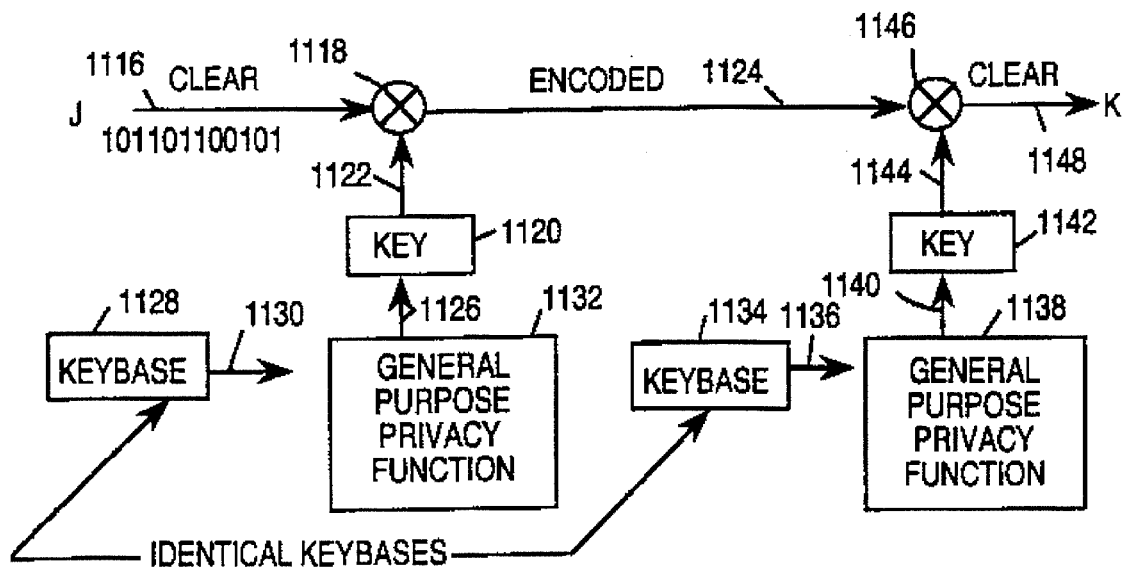
FIG. 18a is a block diagram representation of the keybase privacy encoding technique of the present invention.
Figure 18B:
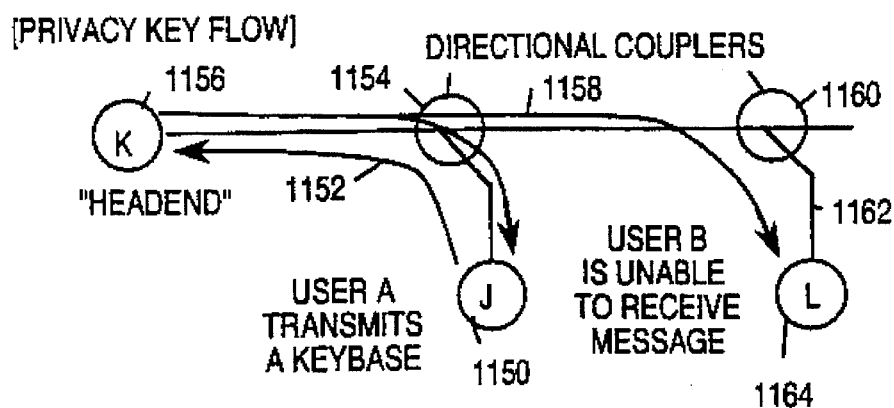
FIG. 18b is a block diagram illustrating the privacy function on a cable system in both the up and down stream directions.

FIG. 18a illustrates a privacy scheme that is particularly useful for protecting the downstream signals to each user on a particular feeder cable which makes use of keybase technology. The method consists of starting with a known keybase in two places, 1128 and 1134, in the system, typically the headend of the feeder cable and the user's device. The keybase is used to derive a more complex function (132 and 1138), and then a more complex function that is called a key, 1120 and 1142, that is combined with the signal to be transmitted or received. The general process uses an X-OR function, 1118 and 1146, to combine the key with the signal since the X-OR function produces a 0 if both signals coming in are the same and a 1 if both signals are different. This arrangement takes a clear signal 1116 and encodes it using the key 1120, which is a pseudo random string, in X-OR 1118 to produce an encoded string 1124 which is difficult to decrypt. Then in X-OR 1146, since key 1142 is the same as key 1120, the signal out of X-OR 1146 is the same as input signal 1116. This method clearly lends itself to implementation in software.

To ensure that both keybases are the same at the user and head ends, the user's device initially on each transmission, whether it be upstream or downstream, sends a keybase to the head end for use in communicating with the user's device. As discussed above, the privacy encoding is only needed with today's equipment in the downstream direction, however, it can easily be employed in both directions.

The use of privacy key codes is old art. One example, widely used, and suitable for packet transmission is the U.S. National Bureau of Standards DES algorithm. That algorithm uses a 48 bit key, known only by the transmitter and the receiver. There is no restriction in this invention to the use of the DES algorithm, which is described solely for illustrative purposes. Other privacy algorithms could be used as well.

While a key may be used for very long periods of time, greater security is offered by frequently changing the key. When transmitting the keybase from a radiating cordless telephone, or other rf terminal device, a direct physical connection to the SIU whenever a keybase is generated will prevent inadvertent radiation of the keybase. Instead of the signal normally being received by the antenna on SIU at the end of the drop cable, it would go directly to the SIU. This hard-wire connection would be used only when changing keybases to prevent its radiation that could be picked up by nearby receivers. The process of changing keybases for cordless devices is automated and occurs whenever the cordless device normally home docks to the SIU for recharging the battery. By use of this described arrangement, only the single authorized terminal end device that provided the keybase is able to decode the downstream data stream. While other devices on the feeder cable, whether belonging to the same or a different user, can "hear" the transmitted packets, they cannot be decode by their devices, wired or wireless.

Figure 19:
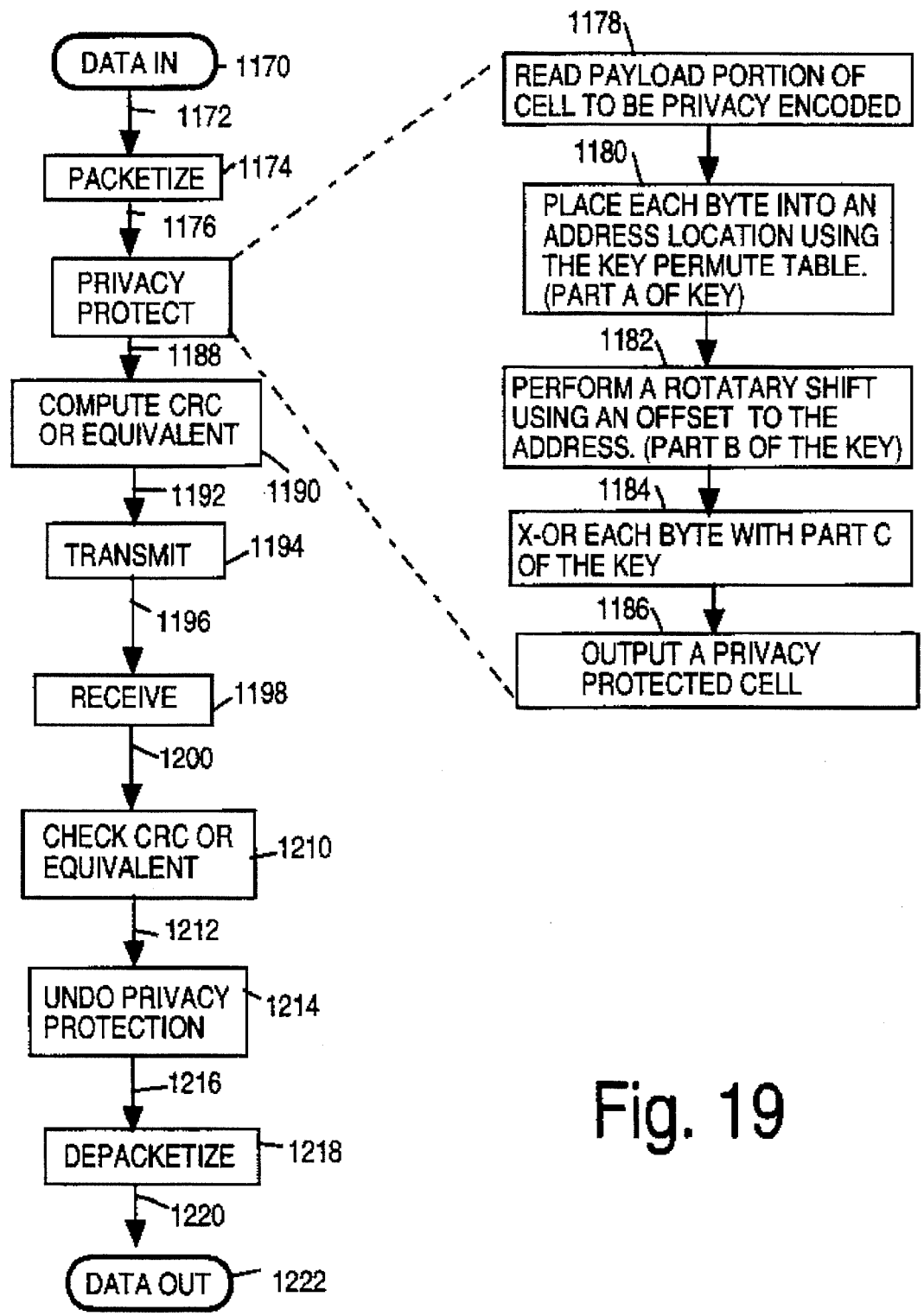
FIG. 19 is a flow chart illustrating the privacy protection of the present invention.

FIG. 19 provides a flow chart of some of the functions that occur in the formation and modification of the cells, including the privacy function that was discussed with respect to FIGS. 18a and 18b. The signal comes as data, e.g. through a microphone, and is packetized (1174), then privacy protected (shown as a series of blocks 1178–1186), next there is the optional computation of the CRC, or equivalent error correction, (1190), followed the transition of the packet (1194). When the packet is received. (1198) the reverse error correction is performed first (1210), the privacy protection is undone (1214), and then the data is depacketize (1218).

In the privacy protect blocks on the right the payload portion of the cell to be privacy encoded is read (1178) and each byte is placed into an address location using the key permute table (1180) (discussed below in regard to FIG. 20b), a rotary shift using an offset of the address is performed (1182), then each byte is X-ORed with another part of the key (1184), and then the privacy protected cell is outputted (1186). So there are three functions: permute of the cells (discussed below), shift of the whole thing, and then the X-OR with the key.

FIG. 20a provides the permutation algorithm in flow chart form for part A of the key of block 1180 in FIG. 19. In general this step is performed the first time and then not very often thereafter. It provides a set of numbers where no number has been used before. This is done by selecting a random number that is the keybase start function (1240) and use it to start a list of keybase numbers. Each future keybase number that is generated is checked against that list to see if the number has appeared before (1242) and if it has it is skipped and another number is selected and rechecked until a number is found that is not in the series (1244). The concept here derives from Shannon's theory of secrecy which states that it is necessary that one use at least two functional steps that are alternated to ensure secrecy.

FIG. 20b is a more detailed flow chart that illustrates one of many more specific algorithms that can be used to create a random number for the keybase as in FIG. 20a. Initially a random number keybase is generated (1254) and then take the next 6 bits (1258). The number from block 1258 is checked to see if it is between 0 and 47 (1262), if it is it is written into a temporary register (1266), if it is not 16 is subtracted from that number (1286). From both block 1266 and block 1286 the next step is to check to see if the number is in the list of previously used numbers (1292), if it is the next unassigned number is selected (1294) followed by that number being added to the list (1274) which is also the block that follows block 1292 is the result is no. From block 1274 flow proceeds to block 1278 where the list is checked to see if it is complete, if it is the list is stored in an EPROM (1300) and if the list is not complete flow returns to block 1258 to continue.

FIG. 21a illustrates the standard ATM cell of 53 bytes; 48 bytes in the payload 1352 and a 5 byte header 1354. Then the conventional approach is to place the packet of FIG. 21a inside another packet as in FIG. 21b with the additional headers 1358 and 1360 being the headers of the added packets. This then presents a very long ATM cell.

Given the fact that the 5 byte header of the single ATM cell of FIG. 21a does not provide enough address space for the present invention, and that a payload of less than half the 48 byte payload of the prior art ATM cell is all that is necessary to transmit the data of interest in the present invention the solution that was selected is to use a portion of the 48 byte payload for the balance of the necessary address for the present invention. This results in two levels of routing, one as the initial header of the cell which provides enough information to direct the cell to the appropriate telephone or cable TV system of the present invention, and additional address information within the original payload section of the cell for the balance of the address for use within the cable TV system, or the end point of the cell, to direct the cell to the individual user's device.

The ATM cell of the present invention is illustrated in FIG. 21c with the macro address in the 5 byte header followed by 16 bytes of local address and hashed device serial number 1364, followed by a reserved area 1366, with 24 bytes of payload 1362 at the end of the cell. The serial number is hashed to create a terminal device number from the serial number that is burned into each user device. The device serial number is usually a very large number, so it is hashed, or put through a random processor, to create a shorter terminal device number and then that number is used in place of the serial number of the individual device. Statistically the chance of having two terminal device numbers that are the same is very small. This is done to make sure that the cell came through the right path and had the right terminal device number (serial number) in case something happened to the cell at some point in the system. Each packet also contains the to and from addresses of the sending device and the intended receiving device, as well as the terminal device numbers (hashed serial number). There is plenty of space for this with 8 bytes left over for spare.

Figure 24:
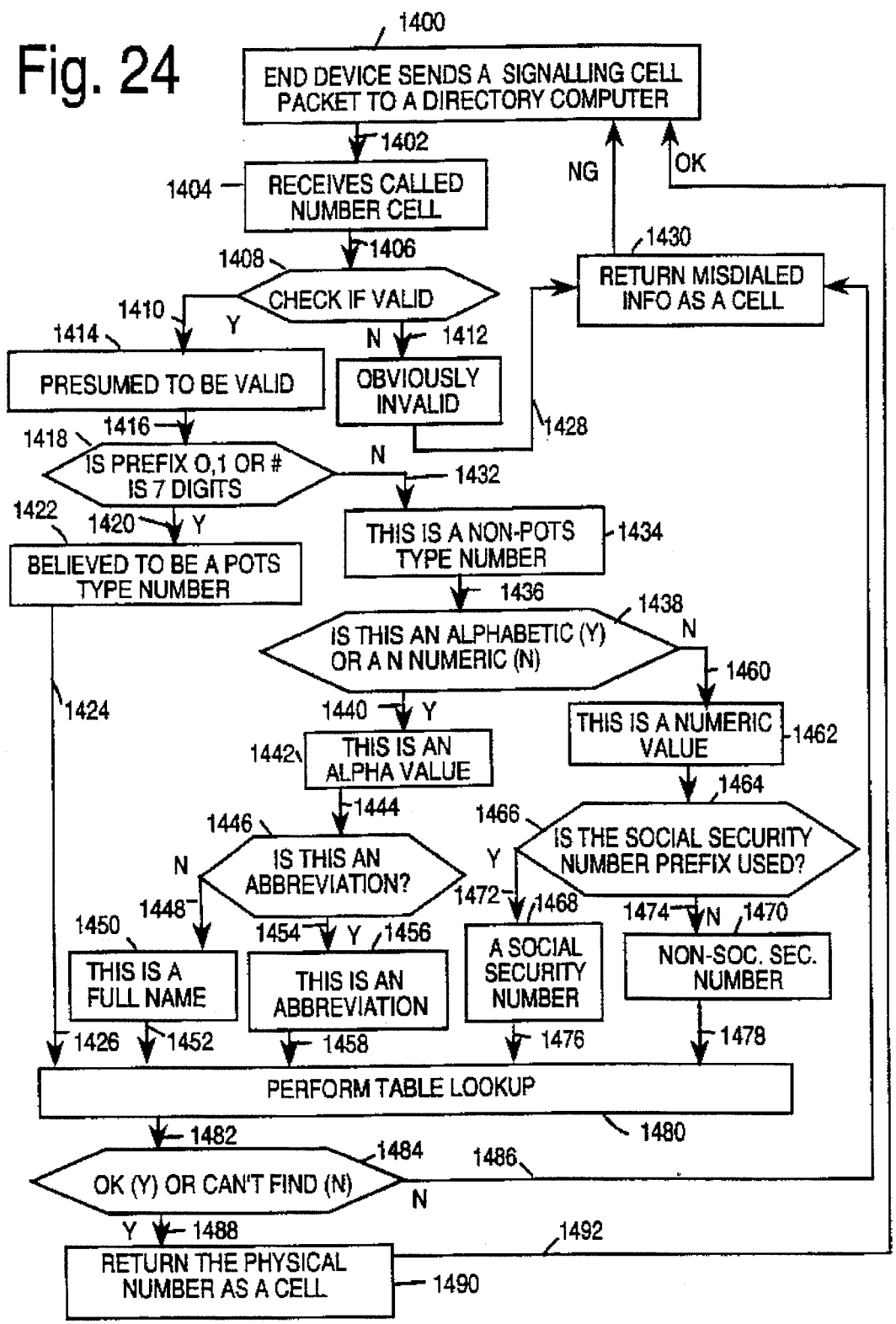
FIG. 24 is a flow chart of the incoming cell flow of the directory computer of the present invention.

FIG. 24 is a flow chart that illustrates the handling of a cell by the directory computer. The present invention allows new users when they first sign up with the particular cable TV system and the associated directory computer to select any name or number that the user many want to use with the only restriction being that it has not already been assigned. If the user does not select one, then the system will assign one for that user. The operational flow of the directory computer begins with the user's end device sending a signalling cell to the directory computer (1400) which receives the number cell (1404) and proceeds to check the validity of the number (1408). If the number is not valid it is returned as a misdialed information cell (1430), and if it is valid the prefix is checked to see if it is 0, 1 or a seven digit number (1418). If it is the number is believed to be a POTS number (1422) and a table look-up is performed (1480). If it is not a POTS type number (1434) it is checked to determine if it is alphabetic or numeric (1438). If it is alphabetic it is checked to see if it is an abbreviation (1446), if not it is assumed to be a full name (1450), and if it is it is identified as such (1456). Then from blocks 1450 and 1456 a table look-up is performed (1480). If the non-POTS number was found to be numeric in block 1438 it is checked to see if it is a social security number (1460), and then confirmed as being such or not (1468 and 1470, respectively), followed by the performance of a table look-up function (1480). Following the table look-up for whatever reason there a confirmation that the number conversion to a physical address in the table look-up was either successful or not (1484). If it was successful the physical address number is returned as a cell to the user's end device (1490) to rubber stamp the data cells sent. If a physical address number could not be found in the table look-up, then the cell is returned to the user's end device as misdialed information (1430).

Figure 25:
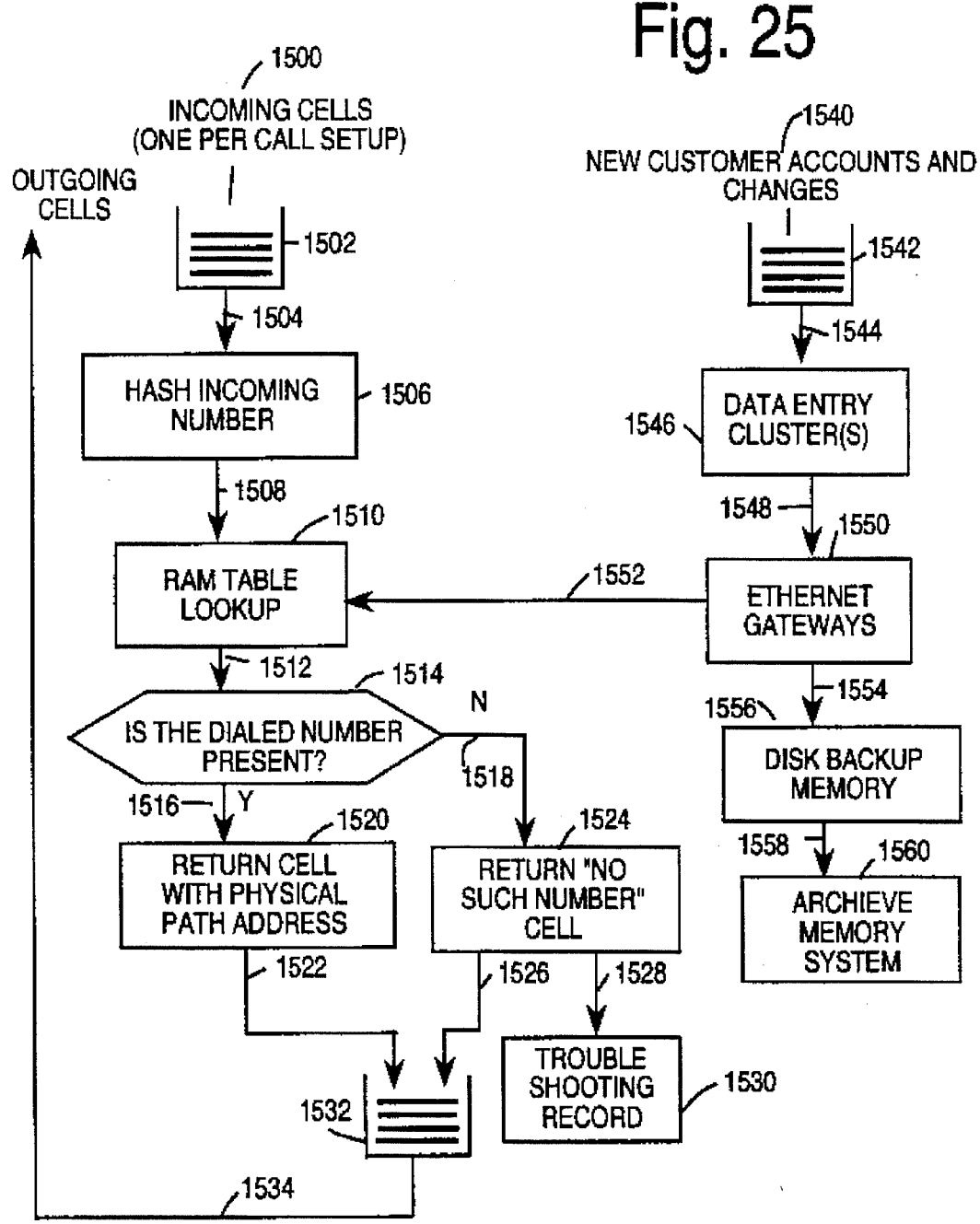
FIG. 25 is a simplified flow chart of the flow through the directory computer of the present invention.

FIG. 25 is a simplified flow chart of the operation of the directory computer that illustrates the handling of in-coming calls, including calls from new customers or account changes. Incoming calls (one per call set-up) (1500) are received and stacked to provided buffering if necessary (1502), the incoming number is then hashed (1506), followed by a table look-up for that number (1510). If the corresponding physical address number was present in the look-up table (1514) the physical address number is returned to the user's device (1520) through stack 1532 as necessary. If the physical address was not present in the table look-up a no such number message is returned to the user's device (1524) also through stack 1532 and a troubleshooting record is generated (1530).

If there is a new customer, or an existing customer has purchased a new device, information on the user's device must be entered into ram table look-up 1510 before that device can be used on the system. To enable the entry of that additional information into the directory computer RAM, an Ethernet gateway 1550 is provided. Since this may be a very active function on any system, there can be up to 64 of these gateways. To illustrate the function of the addition of user devices into the system assume that a user has purchased a new device at a local electronics store. The device, or the box containing the device, would have printed thereon a number which is keyed to the number burned into the device electronics for identification by the system, the user then calls a central site for the local cable TV system and gives the customer service representative that number and a credit card, if they are a new user. At the same time the user can provide the proposed name that they wish to use or the system will assign one and the user will be given that number. The information provided by the user is entered into a stack 1542, as necessary, and then data is entered in clusters (1546) via one of the Ethernet gateways (1550) to RAM 1510. At the same time the entered information is added to a backup memory 1556 and archived (1560).

Figure 26:
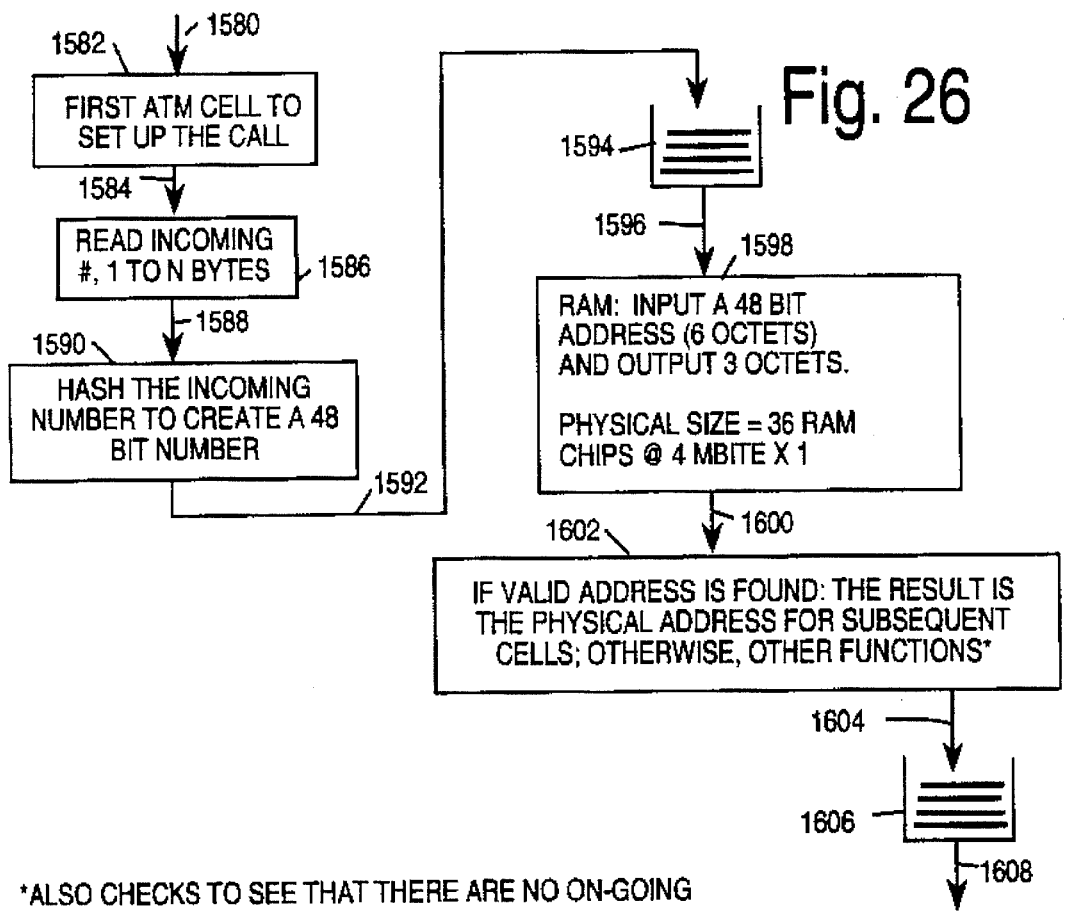
FIG. 26 is a flow chart to illustrate the flow for searching the table of the directory computer of the present invention.

FIG. 26 is another flow chart of the operation of the directory computer for the table searching operation. The incoming first ATM cell to setup the call is received (1582) and the incoming number is read (1586) and followed by the hashing of that number to create a 48 byte number (1590). The hashing of the incoming number is necessary since the incoming names can be very long names. The object is to make it easy to look-up names so they are squished down to a number of a uniform 48 bits. The hashed number is then added to a buffer (1594), as needed, before being applied to the table look-up (1598) which is fairly small at about 4 Mbits which requires only 36 chips to implement. From the table look-up, as discussed above, if a valid physical address is found it is returned to the user's device (1602) through a buffer 1606, as necessary, to rubber stamp the cells of the data transmission.

Although the description above primarily discusses the use of present generation of implementation techniques, some of specific technologies involved in the preferred embodiment are expected to change as time evolves. For example, fiber optic trunks will likely be used instead of TV feeder cables. It should be understood that the invention is broad in concept and terms like wireless data terminal device should be understood to include wireless LANs and even wired devices inasmuch as the same system can handle hardwired devices as well as wireless devices.

As will be understood by those familiar with the art, the invention may be embodied in other specific forms without departing from the spirit or essential characteristics thereof. The scope of the present invention is limited only by the scope of the claims appended hereto.

What is claimed is:

1. In a communications network, an arrangement to define the virtual path to be taken by ATM cells from a calling terminal device to a called terminal device comprising:

a calling terminal device which sends out a call establishment ATM cell, the payload of said call establishment cell containing the number of said called terminal device;

a local switching system coupled to said calling terminal device which utilizes the information received from said calling terminal device and contained within both the header and the payload section of said call establishment ATM cell for routing said ATM cell;

a long distance switching network coupled to said local switching system using information contained within said header of said call establishment ATM cell being switched and received from said local switching system for routing said ATM cell; and a directory computer coupled to said local switching system, said directory computer includes a table lookup unit to translate the number of said called terminal device to a physical path description through said local switching system and said long distance switching network, and to send an ATM cell containing said physical path description to said calling terminal device for inclusion within subsequent cells sent by said calling terminal device to route said subsequent cells to said called terminal device directly through said local switching system and said long distance switching network.

2. A communications switching network to serve a plurality of terminal devices, each terminal device having an individual address that is in-part in a 5 byte header and in-part in a 48 byte payload within an ATM cell, said network comprising:

a plurality of local switches; and a plurality of long distance switches with each switch being a digital access cross connect DACS ATM switch;

wherein each local switch is connected between said terminal devices and said long distance ATM switches; and wherein each local switch is capable of processing and directing ATM cells containing the addresses of sending and receiving terminal devices by virtue of using the address information contained within both the header and payload portions of the ATM cells.

3. A communications switching network as in claim 2 wherein:

the address information contained in the payload portion of an ATM cell contains both the address of the terminal device to which the cell is to be delivered and the address of the sending terminal device together with the serial number or an abbreviated serial number of the destination terminal device; and said network further includes a comparator unit to compare the serial number at the destination terminal device with the serial number or abbreviated serial number within the payload portion of a received ATM cell to prevent accidental misdirection of cells without necessary reliance on a cyclical redundancy check.

4. A method for establishing a virtual circuit in an ATM network transporting 53 byte ATM cells having a 5 byte header and a 48 byte payload section in said ATM network having a multiplicity of terminal interfaces, said virtual circuit being between a first terminal device connected to a first terminal interface of said ATM network and a second terminal device connected to a second terminal interface of said ATM network, said ATM network having a directory computer connected to a third terminal interface of said ATM network, and said first terminal device transmits and receives cells containing routing information in-part within said 5 byte header of said cells for ATM network routing and in-part within said 48 byte payload section of said 53 byte ATM cells to address other individual terminal devices or said directory computer, said method comprising the following sequential steps:

a. a user inserting a telephone number or name designation of said second terminal device into said first terminal device to designate said second terminal device as being the device to be connected to said first terminal device;

b. said first terminal device creating a first ATM cell containing the telephone number or name designation of each of said first and second terminal devices in said 48 byte payload section of said first ATM cell and said first terminal device transmitting said first ATM cell to said directory computer via said ATM network;

c. said directory computer receiving said first ATM cell;

d. said directory computer translating said telephone number or name designation contained in said received first ATM cell for each of said first and second said terminal devices to define routing path information between said first and second terminal devices through the said ATM network;

e. said directory computer creating a second ATM cell containing said routing path information through said ATM network within said 5 byte header of said second ATM cell and said telephone or name for each of said first and second terminal devices within said 48 byte payload section of said 53 byte second ATM cell;

f. said directory computer transmitting said second ATM cell to said first terminal device via the ATM network;

g. said first terminal device receiving said second ATM cell;

h. said first terminal device creating additional ATM cells each having the same 5 byte header as said second ATM cell and by inserting said routing path information contained within said 48 byte payload section of said second ATM cell into the 48 byte payload section of each subsequent ATM cell transmitted from said first terminal device to said second terminal device via said ATM network.

5. A method for establishing a virtual circuit in an ATM communications network as in claim 4 wherein said name designation is composed of alphanumeric characters.

\* \* \* \* \*